US012328054B2

(12) United States Patent
Nafe et al.

(10) Patent No.: US 12,328,054 B2
(45) Date of Patent: Jun. 10, 2025

(54) ELECTRIC TERMINAL ASSEMBLY OF A DRIVE UNIT FOR USE IN A MINING MACHINE

(71) Applicant: Caterpillar Inc., Peoria, IL (US)

(72) Inventors: Michael Nafe, Holzwickede (DE); Dennis Grimm, Nordkirchen (DE); Thomas Hoelken, Bergkamen (DE)

(73) Assignee: Caterpillar Global Mining Europe GmbH, Lünen (DE)

( * ) Notice: Subject to any disclaimer, the term of this patent is extended or adjusted under 35 U.S.C. 154(b) by 433 days.

(21) Appl. No.: 17/780,295

(22) PCT Filed: Nov. 17, 2020

(86) PCT No.: PCT/EP2020/025519
§ 371 (c)(1),
(2) Date: May 26, 2022

(87) PCT Pub. No.: WO2021/104665
PCT Pub. Date: Jun. 3, 2021

(65) Prior Publication Data
US 2023/0142261 A1    May 11, 2023

(30) Foreign Application Priority Data
Nov. 26, 2019    (GB) ..................................... 1917196

(51) Int. Cl.
*H02K 5/22*    (2006.01)
*E21C 31/12*    (2006.01)
(Continued)

(52) U.S. Cl.
CPC ............. *H02K 5/225* (2013.01); *E21C 31/12* (2013.01); *H02K 7/116* (2013.01)

(58) Field of Classification Search
CPC .......... H02K 5/22; H02K 5/225; H02K 11/35; H02K 11/21; H02K 11/24; H02K 11/25;
(Continued)

(56) References Cited

U.S. PATENT DOCUMENTS

| 4,206,661 A |   | 6/1980 | Horstmann et al. |
| 5,223,671 A | * | 6/1993 | Alfieri ..................... F16K 31/05 |
|             |   |        | 74/606 R |

(Continued)

FOREIGN PATENT DOCUMENTS

| CN | 109563915 A       | 4/2019 |                    |
| DE | 102014009315 A1 * | 12/2015 | ............. H02K 11/33 |

(Continued)

OTHER PUBLICATIONS

International Search Report related to Application No. PCT/EP2020/025519; reported on Jan. 26, 2021.
(Continued)

*Primary Examiner* — Edgardo San Martin

(57) ABSTRACT

The present invention refers to an electric terminal assembly of a drive unit for use in a mining machine. The electric terminal assembly comprises a junction box configured to be mounted to the drive unit and a connecting element for communicatively connecting the junction box to a control device of the drive unit. The electric terminal assembly is configured to be convertibly arranged into at least two different configurations, each of which is associated to a different structural arrangement of the drive unit.

15 Claims, 15 Drawing Sheets

(51) Int. Cl.
*H02K 7/116* (2006.01)
*H02K 11/35* (2016.01)

(58) Field of Classification Search
CPC .......... H02K 11/33; H02K 7/116; H02K 7/10; H02K 2213/12; E21C 31/12
See application file for complete search history.

(56) References Cited

U.S. PATENT DOCUMENTS

| | | | | |
|---|---|---|---|---|
| 6,232,553 | B1 * | 5/2001 | Regen | H02G 3/083 |
| | | | | 174/64 |
| 6,828,704 | B2 * | 12/2004 | Okamoto | H02K 5/225 |
| | | | | 220/3.7 |
| 6,975,508 | B2 * | 12/2005 | Hoegener | H05K 7/1481 |
| | | | | 439/551 |
| 8,245,681 | B2 | 8/2012 | Wanner et al. | |
| 10,097,061 | B2 * | 10/2018 | Vohlgemuth | H02K 11/33 |
| 10,630,141 | B2 * | 4/2020 | Iso | H02K 3/28 |
| 2006/0119188 | A1 * | 6/2006 | Uvermann | E21C 31/02 |
| | | | | 310/10 |
| 2009/0180827 | A1 | 7/2009 | Katcher | |
| 2011/0162466 | A1 | 7/2011 | Hillyer et al. | |
| 2015/0256049 | A1 * | 9/2015 | Gacka | H02K 11/33 |
| | | | | 310/68 D |
| 2018/0138839 | A1 | 5/2018 | Puzio et al. | |

FOREIGN PATENT DOCUMENTS

| | | | | |
|---|---|---|---|---|
| EP | 1237260 | A2 * | 9/2002 | .......... H02K 11/046 |
| EP | 1950870 | A2 | 7/2008 | |
| EP | 2482428 | A2 * | 8/2012 | .......... H02K 11/049 |
| EP | 3218997 | B1 | 1/2019 | |
| EP | 2879931 | B1 | 4/2019 | |
| FR | 2978629 | A1 * | 2/2013 | .......... H02K 19/365 |

OTHER PUBLICATIONS

Great Britain Search Report related to Application No. 1917196.6; reported on Aug. 4, 2020.

* cited by examiner

ELECTRIC TERMINAL ASSEMBLY OF A DRIVE UNIT FOR USE IN A MINING MACHINE

CROSS-REFERENCE TO RELATED APPLICATION

This Application is a 35 USC § 371 US National Stage filing of International Application No. PCT/EP2020/025519 filed on Nov. 17, 2020 which claims priority under the Paris Convention to Great Britain Patent Application No. 1917196.6 filed on Nov. 26, 2019.

TECHNICAL FIELD

The present invention relates to an electric terminal assembly of a drive unit for use in a mining machine, i.e. an underground mining machine, and to a drive unit arrangement which is equipped with such an electric terminal assembly.

Technological Background

Mining machines, in particular longwall mining machines, are equipped with a plurality of drive units for actuating or driving operating equipment, such as conveyors, cutters or other driven, i.e. traction chain driven components. Usually, the employed drive units are provided with a modular design for increasing their reusability and standardization among and within such mining machines. This modular design of the drive unit may comprise a high-performance motor, i.e. electric motor, to which a large gearbox is flange-mounted. Further, the drive unit may comprise a clutch interposed between the electric motor and the gearbox. The large gearbox and the associated clutch, if any, are used for introducing high drive power of the electric motor into drive shafts, e.g. of a chain wheel of the driven equipment.

In underground mining, it is known to use so-called Controlled Start Transmission (CST) drive systems which are provided with a modular design. In such a drive system, the gearbox, usually a planetary gearing or bevel gearing with an incorporated clutch for starting the machine, is disposed in a casing part being provided separately from a further casing part accommodating the electric motor. In such a drive system, the operating condition of the individual gear components is monitored for ensuring proper operation of the drive system. For doing so, the gearbox is equipped with a plurality of sensors which measurement results are collected and pre-processed in an electronic measurement-collecting device before being supplied to a control device or drive computer of the drive system. For example, from US 2006/0119188 A1 a CST drive system is known, in which the electronic measurement-collecting device and the control unit are accommodated in a casing disposed on an outer surface of a motor housing.

The modular design of the CST drive system enables that it can be adapted to different mounting conditions, thereby providing a certain degree of configurability. For example, the known CST drive system allows for arranging the electric motor and the gearbox in different structural arrangements relative to one another.

However, during maintenance or when such drive unit arrangements need to be reconfigured, i.e. if their structural arrangements need to be adapted or rearranged, installation and de-installation of such arrangements may be time- and cost-consuming. Particularly, installation and de-installation of an electric terminal, i.e. electric wiring, required for proper operating state detection and control may require high effort and adequately skilled personnel.

Summary of the Invention

Starting from the prior art, it is an objective to provide an improved electric terminal assembly of a drive unit which, in particular, facilitates installation and de-installation of the drive unit and, at the same time, contributes to a modular design thereof. Further, it is an objective to provide a drive unit arrangement which is equipped with such an electric terminal assembly.

These objectives are solved by means of an electric terminal assembly and a drive unit arrangement according to the independent claims. Preferred embodiments are set forth in the present specification, the Figures as well as the dependent claims.

Accordingly, an electric terminal assembly of a drive unit for use in a mining machine is provided. The electric terminal assembly comprises a junction box configured to be mounted to the drive unit and a connecting element for communicatively connecting the junction box to a control device of the drive unit, wherein the electric terminal assembly is configured to be convertibly arranged into at least two different configurations, each of which is associated to a different structural arrangement of the drive unit.

Furthermore, a drive unit arrangement is provided which comprises a drive unit and the electric terminal assembly as described above.

Since the drive unit arrangement is equipped with the above described electric terminal assembly, technical features which are described in connection with the electric terminal assembly in the present disclosure may also relate and be applied to the proposed drive unit arrangement, and vice versa.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
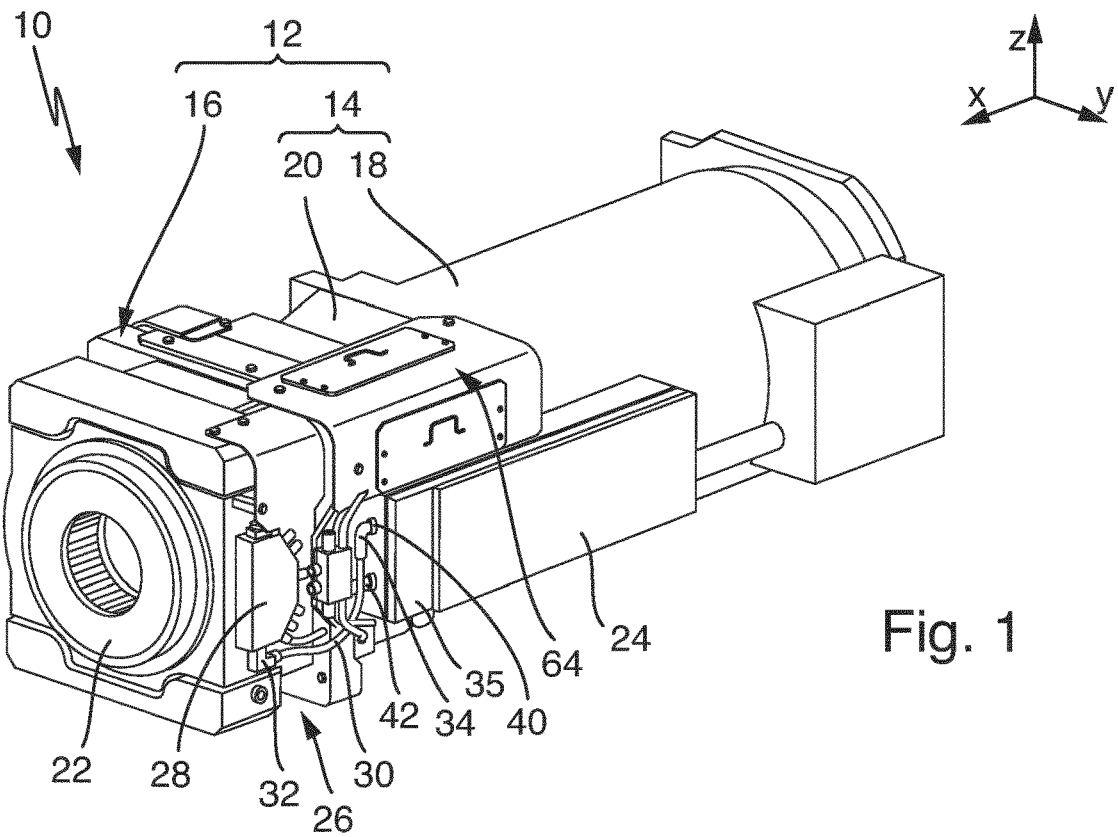
FIG. 1 schematically shows a perspective view of a drive unit arrangement according to a first embodiment which is equipped with a drive unit of a first structural arrangement and an electric terminal assembly arranged in a first configuration.

In the following, the invention will be explained in more detail with reference to the accompanying figures. In the Figures, like elements are denoted by identical reference numerals and repeated description thereof may be omitted in order to avoid redundancies.

FIG. 1 depicts a drive unit arrangement 10 which is employed in a mining machine (not shown), in particular an underground mining machine. Specifically, the drive unit arrangement 10 is configured to drive an operating equipment of the mining machine, such as a conveyor, a cutter or any other electrically driven component. For example, the drive unit arrangement 10 may be configured to actuate a chain wheel of a traction chain. Further, the mining machine may be equipped with a plurality of such drive unit arrangements 10 so as to increase reusability and thereby decrease costs of such components.

The shown drive unit arrangement 10 is equipped with a drive unit 12 comprising a motor unit 14 to which a gearbox 16 is flange-mounted. Specifically, the motor unit 14 comprises an electric motor 18 accommodated in a cylindrically shaped housing to which a clutch 20 is flange-mounted such that the clutch 20 is interposed between the electric motor 18 and the gearbox 16. In the shown arrangement, the clutch 20 is configured to connect an output shaft of the electric motor 18 to an input shaft of the gearbox 16 in a torque-transmitting manner. In an alternative embodiment of the drive unit arrangement 10, the clutch 20 may be omitted.

The gearbox 16 may be provided in the form of a planetary gearing or bevel gearing. An output shaft 22 of the gearbox 16 is connected to a drive shaft (not shown) of the operating equipment to be driven such that a torque generated by the electric motor 14 is transmitted to and thereby rotatably actuates the drive shaft of the operating equipment.

In the shown configuration of the drive unit 12, the output shaft of the electric motor 18 is arranged parallel to the output shaft 22 of the gearbox 16. In other words, the output shaft of the electric motor 18 and the output shaft 22 of the gearbox 16 are both arranged in parallel to a longitudinal axis X of the drive unit arrangement 10. Such an arrangement of the drive unit 12 may be referred to as a "P-arrangement".

The drive unit 12 may further be equipped with one or more supply units comprising, for example, at least one of a cooling-oil pump, a high pressure pump, a heat exchanger, a hydraulic control, a filter, etc.

Furthermore, a main terminal box 24 is provided which is mounted to an outer surface, i.e. a housing, of the motor unit 14 and accommodates, inter alia, a control device of the drive unit 12. The control device is configured to control operation of the drive unit 12, particularly by selectively supplying electric energy to the electric motor 18 and the at least one supply unit.

In order to ensure proper operation of the drive unit 12, the control device is configured to monitor operating conditions of the drive unit's components, in particular of individual gear components of the gearbox 16. For doing so, at least three sensors are provided, each of which is configured to detect or measure an operation of the drive unit's components, thereby acquiring data being indicative of its operating condition. Based on the thus acquired data, the control device is configured to monitor and control operation of the drive unit 12.

In order to transmit the acquired data from the different sensors to the control device accommodated in the main terminal box 24, the drive unit arrangement 10 further comprises an electric terminal assembly 26. In other words, the electric terminal assembly 26 is configured to communicatively connect the control device provided in the main terminal box 24 to the different sensors provided in the gearbox 16 so as to enable an exchange of data and information therebetween.

The electric terminal assembly 26 is releasably or detachably mounted to an outer surface, i.e. a housing, of the drive unit 12. In the context of the present disclosure, the term "releasably or detachably mounted" means that a component may be released or detached from another component without damaging neither the component itself or the other component to which it is mounted such that it can be disassembled and thereafter reassembled without the need of replacing or exchanging individual parts.

Figure 2:
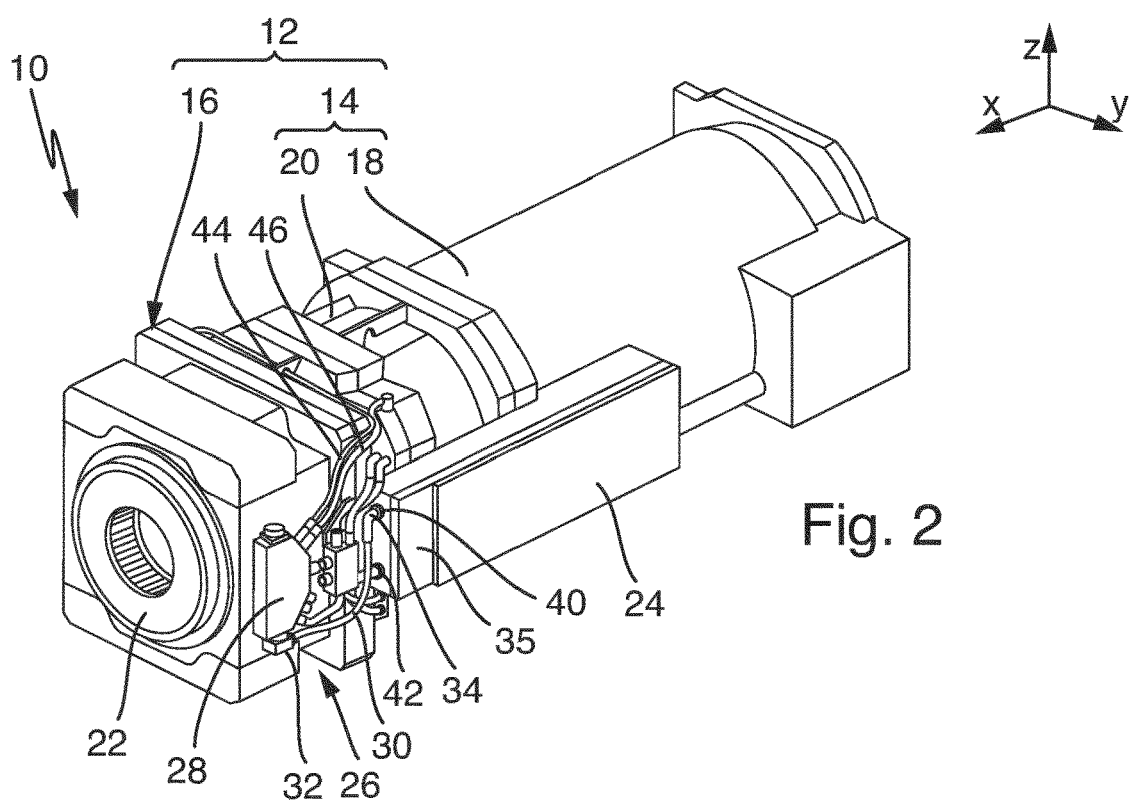
FIG. 2 schematically shows a perspective view of the drive unit arrangement depicted in FIG. 1, from which a protective cover of the electric terminal assembly is removed.

Specifically, the electric terminal assembly 26 comprises a junction box 28 which is detachably mounted to an outer surface, i.e. a housing or casing, of the gearbox 16, as can be gathered from FIG. 2. Generally, according to the present disclosure, the term "junction box" refers to a component that form part of a wiring system or an electric circuit that in particular provides a housing and thus a protection for electric and electronic components, e.g. for electric connections. The junction box 28 accommodates an electronic measurement-collecting device, also referred to as the data-collecting device, which receives measurement data acquired by the different sensors. Specifically, the data-collecting device is configured to perform pre-processing of the received measurement data so as to bundle and consolidate the received measurement data, in particular in a predetermined form, before being forwarded to the control device.

For transmitting the pre-processed data to the control device, a connecting element 30 is provided for communicatively connecting, i.e. electrically connecting, the main terminal box 24, i.e. the control device, to the junction box 28, i.e. the data-collecting device. The connecting element 30 is provided in the form of an electric cable, in particular a multipole cable, e.g. a 37-pole cable, which at its opposing end sections is equipped with plug connectors 32, 34 for detachably coupling the connecting element 30 to both a connection socket 35 mounted to the main terminal box 24 and the junction box 28. The connection socket 35 is provided on a control device side of the electric terminal assembly 26.

Figure 3:
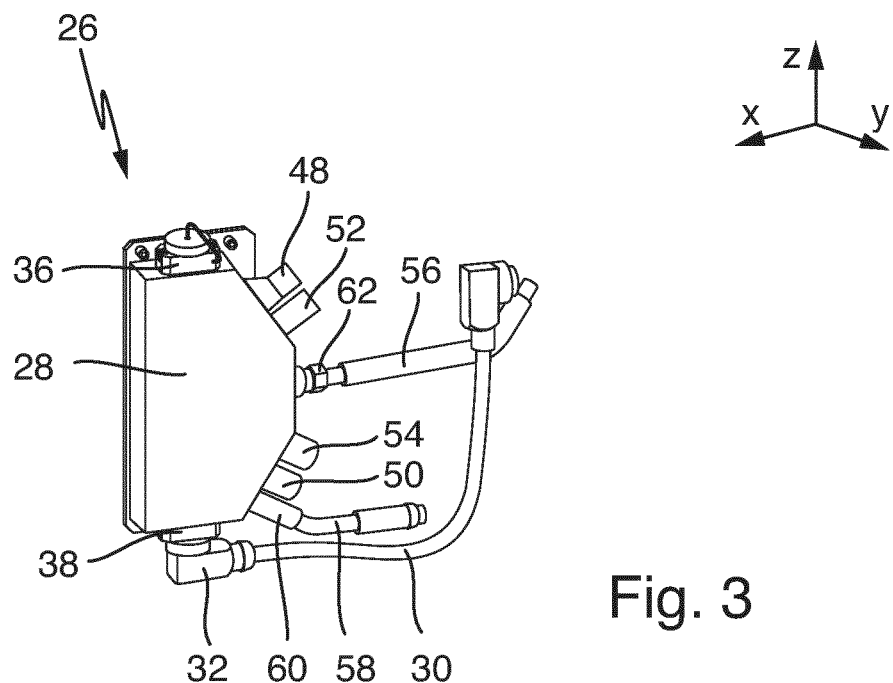
FIG. 3 schematically shows a perspective view of a junction box and an electric connection connected thereto of the electric terminal assembly used in the drive unit arrangement depicted in FIGS. 1 and 2.

Specifically, as can be gathered from FIG. 3, a first plug connector 32 of the connecting element 30 is configured to be detachably coupled to complementary designed electrical interfaces 36, 38 at the junction box 28, particularly in the form of a plug connector or socket, each of which is configure to be detachably coupled to the connecting element 30. The junction box 28 is provided with a first control port 36 and a second control port 38 being disposed on opposed sides of the junction box 28 and designed complementary to the first plug connector 32. By such an arrangement, the first plug connector 32 can be selectively coupled to either the first or the second control port 36, 38 without affecting operation of the control device. In other words, for the connection between the junction box 28 and the main terminal box 24 it makes no difference whether the first plug connector 32 is connected to the first control port 36 or the second control port 38. As a result, a junction for the first plug connector 32 is redundantly provided at the junction box 28. In the context of the present disclosure, the term "control port" refers to a port which is configured to communicatively connect the junction box to the control device.

As can be gathered from FIG. 2, a second plug connector 34 of the connecting element 30 is configured to be detachably coupled to complementary designed electrical interfaces 36, 38 at the connection socket 35, particularly in the form of a plug connector or socket. The connection socket 35 is provided with a first connector 40 and a second connector 42 which are designed complementary to the second plug connector 34. By such an arrangement, the second plug connector 34 can be selectively coupled to either the first or the second connector 40, 42 without affecting operation of the control device. In other words, for the connection between the junction box 28 and the main terminal box 24 it makes no difference whether the second plug connector 34 is connected to the first connector 40 or the second connector 42. As a result, a junction for the second plug connector 34 is redundantly provided.

In the gearbox 16, two sensors are provided which are communicatively connected, i.e. electrically connected, to the junction box 28 via a first sensor line 44 and a second sensor line 46, respectively, as can be gathered from FIG. 2. The first and the second sensor line 44, 46 are configured to transmit measurement data acquired by the respective sensors to the data-collecting device accommodated in the junction box 28. Specifically, the first and the second sensor line 44, 46 are provided in the form of an electric cable.

As can be gathered from FIG. 3, for connecting the first sensor line 44 to the data-collecting device, the junction box 28 is provided with a first sensor port 48 and a second sensor port 50 which are redundantly provided. In other words, the first sensor line 44 can be selectively coupled to either the first or the second sensor port 48, 50. For the functionality of the data-collecting device, it makes no difference whether the first sensor line 44 is connected to the first or the second sensor port 48, 50. Further, the first and the second sensor port 48, 50 are provided on opposed sides of the junction box 28.

Accordingly, for connecting the second sensor line 46 to the data-collecting device, the junction box 28 is provided with a third sensor port 52 and a fourth sensor port 54 which are redundantly provided. In other words, the second sensor line 46 can be selectively coupled to either the third or the fourth sensor port 52, 54. This makes no difference for the functionality of the data-collecting device.

The junction box 28 further accommodates a third sensor configured to measure an operating condition of the gearbox 16. For doing so, the junction box 28 is configured for being connected to a third and a fourth sensor line 56, 58 via a fifth and a sixth sensor port 60, 62, respectively. In the shown configuration, the third and a fourth sensor line 56, 58 are provided in the form of hydraulic lines for fluid-communicatively connecting the third sensor to the gearbox 16.

By the proposed configuration of the electric terminal assembly 26, predetermined and standardized interfaces may be provided for connecting the electric terminal assembly 26 to the drive unit 24. In this way, a connection between components can be repeatably established and released in a simple and effort-reduced manner, thereby facilitating installation and de-installation of the electric terminal assembly 26. Further, by redundantly providing junctions, i.e. ports and connectors, at the junction box 28 and the connector socket 35, configurability of the electric terminal assembly 26 may be increased.

Figure 4:
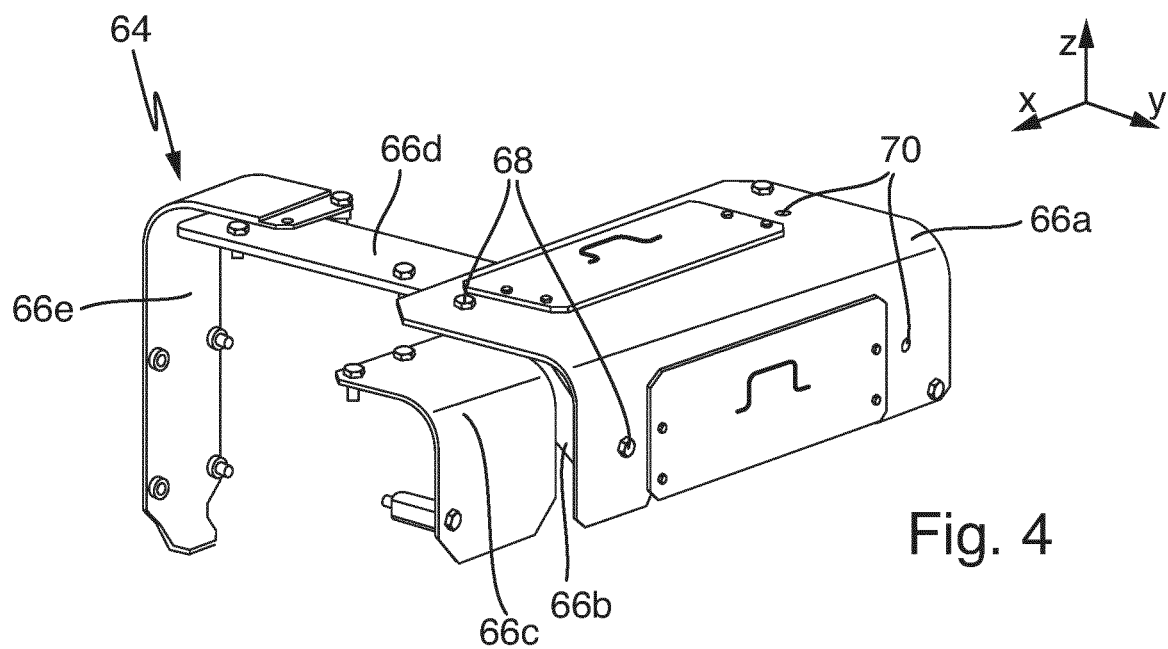
FIG. 4 schematically shows a perspective view of the protective cover of the electric terminal assembly used in the drive unit arrangement depicted in FIGS. 1 and 2.

Furthermore, as can be gathered from FIGS. 1 and 4, the electric terminal assembly 26 comprises a protective cover 64 configured to prevent the electric terminal assembly 26 from being damaged during operation of the mining machine, i.e. to protect the electric terminal 26 from falling material. The protective cover 64 comprises a plurality of interconnected shield plates 66a-e which are configured to be convertibly and variedly connected to one another.

The shown drive unit 12 is of a modular design which enables to adapt the structural arrangement of the drive unit 12 to different mounting conditions or applications. Accordingly, the drive unit 12 may form a so-called CST drive system.

By such a configuration, the drive unit 12 is configured to be arranged into at least two different structural arrangements. Further, the drive unit 12 is configured to be converted or modified from one of the at least two structural arrangements to the other one, and vice versa. In this way, the drive unit 12 may contribute to a configurability of the mining machine, e.g. enabling that the mining machine can be reconfigured during use.

In the context of the present disclosure, the term "structural arrangement of the drive unit 12" particularly refers to a relative arrangement between the drive unit's components, i.e. an arrangement of the motor unit 14, the gearbox 16 and the main terminal box 24 relative to one another.

Figure 5:
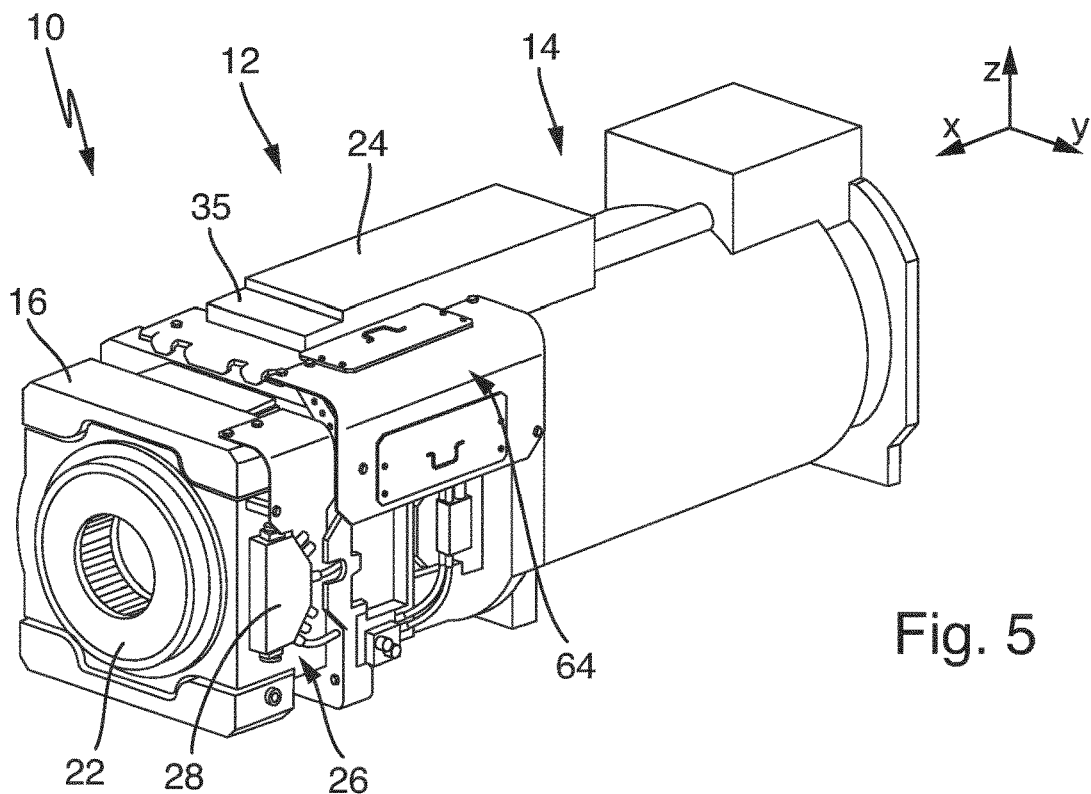
FIGS. 5 to 8 schematically illustrate the drive unit arrangement depicted in FIG. 1, in which the drive unit is configured in a second structural arrangement and the electric terminal assembly is arranged in a second configuration.
Figure 6:
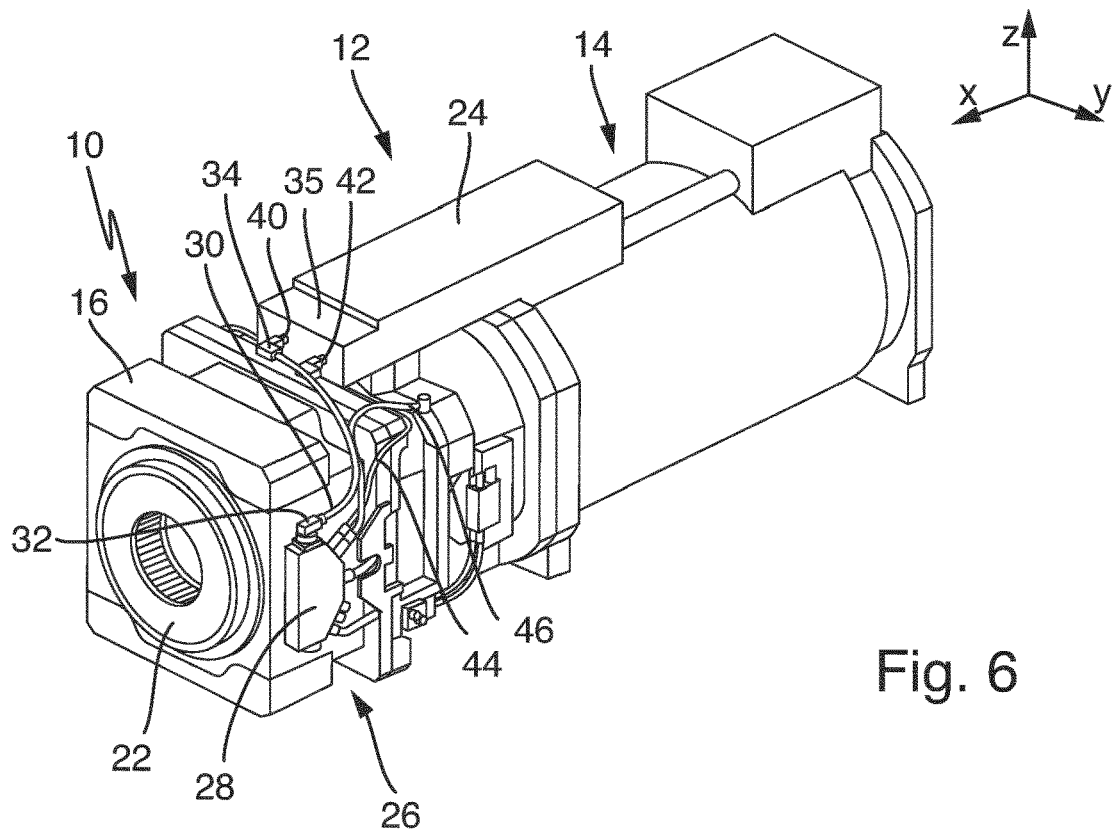

FIGS. 1 and 2 show a first structural arrangement of the drive unit 12, in which the main terminal box 24, when viewed from a direction pointing from the motor unit 14 towards the gearbox 16, are arranged on a left side of the motor unit 14. Compared thereto, FIGS. 5 and 6 illustrate a second structural arrangement of the drive unit 12 depicted in FIGS. 1 and 2, in which the main terminal box 24, when viewed from the direction pointing from the motor unit 14 towards the gearbox 16, are disposed on a top side of the motor unit 14. In other words, the position of the motor unit 14 relative to the gearbox 16 differs among the different structural arrangements. Specifically, in the second structural arrangement depicted in FIGS. 5 and 6, the motor unit 14 together with the main terminal box 24 are rotated or shifted about 90° around the longitudinal axis X of the drive unit arrangement 10 compared to their position in the first structural arrangement depicted in FIGS. 1 and 2.

Likewise to the drive unit 12, also the electric terminal assembly 26 is of a modular design which enables to adapt the arrangement of the electric terminal assembly 26 to the intended different structural arrangements of the drive unit 12. For doing so, the electric terminal assembly 26 is configured to be convertibly arranged into at least two different configurations, each of which is associated to a different structural arrangement of the drive unit 12. In the context of the present disclosure, the term "configured to be convertibly arranged" means that the electric terminal 26 assembly can be releasably and selectively arranged into one of the at least two different configurations and can be releasably converted from one of the two different configurations to the other one, and vice versa. In other words, once the electric terminal assembly 26 has been arranged into a first configuration, it can be disassembled and resembled into the same or a different configuration. In this way, the suggested electric terminal assembly 26 may be of a modular and flexible design which is compatible with different drive units or different structural arrangements thereof.

Further, in the context of the present disclosure, the term "configuration of the electric terminal assembly" refers to a relative arrangement between the electric terminal assembly's components, in particular in a state, in which the electric terminal assembly 26 is mounted to the drive unit 12. Particularly, the configuration of the electric terminal assembly 26 may refer to a relative arrangement between the junction box 28, the electric connection 30, the connection socket 35, and the sensor lines 44, 46, 56, 58.

As set forth above, each of the at least two different configurations of the electric terminal assembly 26 is associated to one of the different structural arrangements of the drive unit 12. In other words, when the drive unit 12 is arranged into the first structural arrangement, the electric terminal assembly 26 mounted thereto is disposed into a first configuration as depicted in FIGS. 1 to 4. Accordingly, when the drive unit 12 is arranged into the second structural arrangement, the electric terminal assembly 26 is mounted to the drive unit 12 such that it is arranged into a second configuration thereof as depicted in FIGS. 5 to 8.

Figure 7:
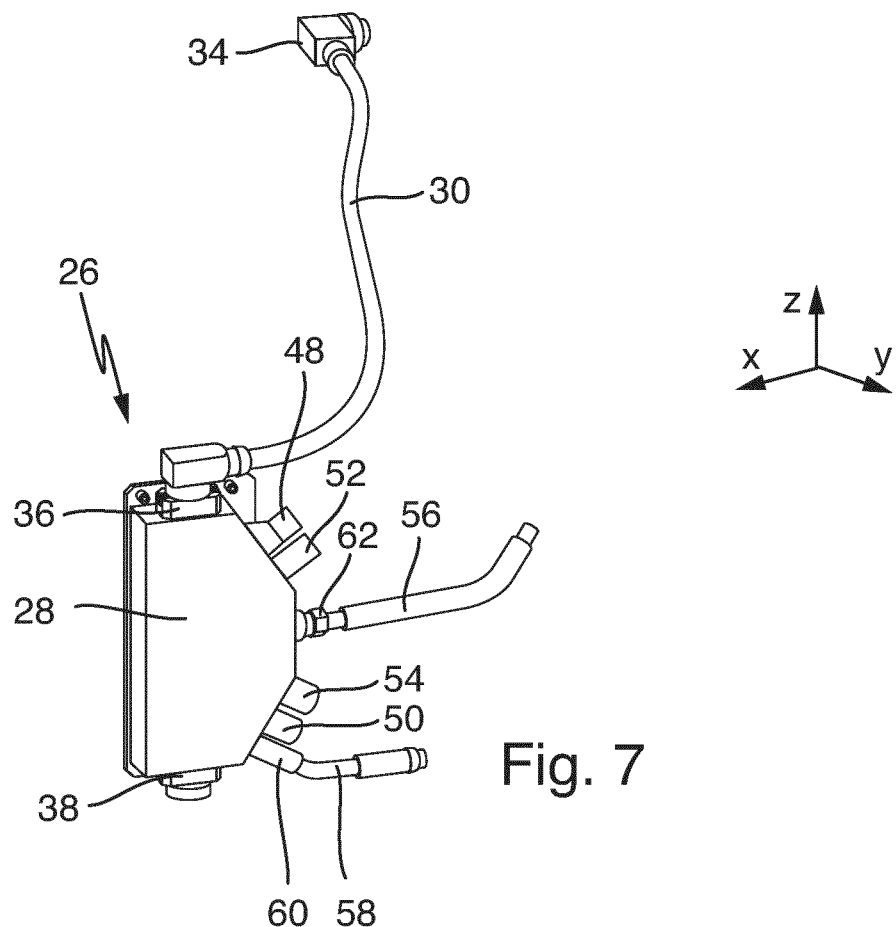

More specifically, when being arranged into its first configuration as depicted in FIGS. 1 to 3, the electric terminal assembly 26 is disposed such that the first plug connector 32 is connected to the first control port 36 of the junction box 28 and the second plug connector 34 of the connecting element 30 is connected to the first connector 40 of the connection socket 35. Compared thereto, when being arranged into its second configuration as depicted in FIGS. 5 to 7, the electric terminal assembly 26 is provided such that the first plug connector 32 is connected to the second control port 38 of the junction box 28 and the second plug connector 34 of the connecting element 30 is connected to the first connector 40 of the connection socket 35.

Further, the electric terminal assembly 26 may be configured to be arranged into a third configuration, in which, compared to the first or second configuration, at least one of the first and second sensor line 44, 46 is connected to the other one of the redundantly provided sensor ports 50, 54 of the junction box 28. This third configuration of the electric terminal assembly 26 may be associated to a structural arrangement of the drive unit 12, in which the main terminal box 24, when viewed in direction of the longitudinal axis X, are arranged on a right side of the motor unit 14. In this third configuration, the connecting element 30, i.e. its first plug connector 32, may be connected to the first control port 36.

Figure 8:
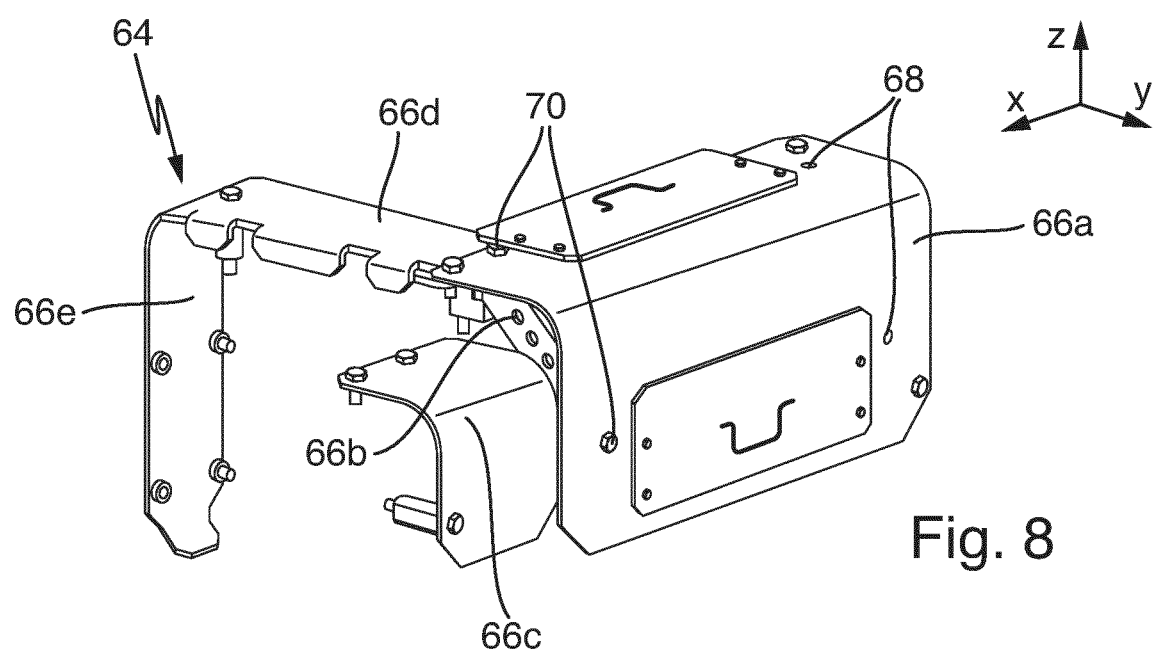

Likewise to the junction box 28, also the protective cover 64 is configured to be convertibly arranged into different configuration as can be gathered particularly from FIGS. 4 and 8. Specifically, the protective cover 64 comprises the plurality of interconnected shielding plates 66a-e which can be convertibly and variably connected to one another. For forming the different configurations of the protective cover 64, individual shielding plates 66a-e can be variedly arranged relative to one another.

In the shown arrangement of the protective cover 64, five shielding plates 66a-e are provided which can be variedly connected to one another. For example, when taking a closer look to a first shielding plate 66a, which forms a large lateral shielding plate of the protective cover 64, it is recognized that its arrangement within the protective cover 64 differs among the first configuration depicted in FIG. 4 and the second configuration depicted in FIG. 8. More specifically, when being arranged into the second configuration, the first shielding plate 66a is rotated about 90° around the longitudinal axis X and about 180° around the lateral axis Y compared to its arrangement within the first configuration as depicted in FIG. 4. In other words, for converting the protective cover 64 from its first configuration to its second configuration, and vice versa, the individual shielding plates 66a-e are designed such that they can be rearranged relative to one another.

For enabling that the protective cover 64 can be arranged and converted into different configurations, individual shielding plates 66a-e are provided with a plurality of structural interfaces 68, 70 for mounting the shielding plates 66a-e to one another. Specifically, these structural interfaces of individual shielding plates 66a-e are designed such that a first part 68 thereof is connected to adjacent shielding plates when the protective cover 64 is arranged in the first configuration, wherein a second part 70 of these structural interfaces does not contribute to a structural connection to other shielding plates 66. However, when the protective cover 64 is arranged into the second configuration, the second part 70 of the structural interfaces is mounted to adjacent shielding plates 66, wherein the first part 68 of the structural interfaces does not contribute to a structural connection to other shielding plates 66.

In other words, at least one shielding plate 66a-e comprises at least one first structural interface 68 and at least one second structural interface 70 which may be provided at opposing end sections of the shielding plate 60. In the first configuration of the electric terminal assembly 26, the at least one first structural interface 68 is detachably mounted to an adjacent shielding plate 66a-e and the at least one second structural interface 70 does not contribute to a structural connection between the shielding plates 66a-e as can be gathered from FIG. 4. In the second configuration of the electric terminal assembly 26, the at least one second structural interface 70 is detachably mounted to an adjacent shielding plate 66a-e and the at least one first structural interface 68 does not contribute to a structural connection between the shielding plates 66a-e as can be gathered from FIG. 8. In this configuration, at least a part of the shielding plates 66 are of a symmetrical, e.g. axially symmetrical, design.

By being provided with the different structural interfaces 68, 70 which are provided and used merely for specific configurations of the electric terminal assembly 26, the protective cover 64 may be provided with a certain degree of configurability, thereby contributing to a modular and flexible design of the electric terminal assembly 26.

By the proposed arrangement, it is enabled that the electric terminal assembly 26 can be arranged into different configurations without exchanging or replacing individual components thereof.

FIGS. 9 to 16 show a second embodiment of the drive unit assembly 10, in which both the drive unit 12 and the electric terminal assembly 16 differ in their structure and composition compared to the embodiment depicted in FIGS. 1 to 8.

Specifically, the structure of the drive unit 12 differs in that the output shaft of the electric motor 18 is arranged orthogonal to the output shaft 22 of the gearbox 16. In other words, the output shaft of the electric motor 18 is arranged in direction of the longitudinal axis X and the output shaft 22 of the gearbox 16 is arranged in direction of the lateral axis Y of the drive unit arrangement 10. Such an arrangement of the drive unit 12 may be referred to as a "KP-arrangement".

FIGS. 9 to 12 show a first structural arrangement of the drive unit 12, in which the output shaft of the gearbox 16, when viewed in direction of the longitudinal axis X, points to the left, i.e. in direction of the lateral axis Y of the drive unit arrangement 10. Further, in this structural arrangement, the main terminal box 24 is arranged on a top side of the drive unit arrangement 10 when viewed in direction of the longitudinal axis X.

FIGS. 13 to 16 show a second structural arrangement of the drive unit 12, in which the output shaft of the gearbox 16, when viewed in direction of the longitudinal axis X, points to the right, i.e. in a reversed direction of the lateral axis Y. Further, the main terminal box 24 is arranged on a left side of the drive unit arrangement 10 when viewed in direction of the longitudinal axis X.

The electric terminal assembly 26 comprises a first junction box 28a and a second junction box 28b, each of which is mounted to an outer surface of the gearbox 16 and communicatively connected to the control device accommodated in the main terminal box 24 via a connecting element 30a, 30b, respectively.

Further, FIGS. 9 to 12 show a first configuration of the electric terminal assembly 26, in which the first junction box 28a is provided on the right side of the drive unit arrangement 10 when viewed in direction of the longitudinal axis X, wherein the second junction box 28b is provided on a front surface thereof. To that end, FIGS. 13 to 16 show a second configuration of the electric terminal assembly 26, in which the first junction box 28a is provided on the left side of the drive unit arrangement 10 when viewed in direction of longitudinal axis X. Further, in the second configuration, the second junction box 28b is provided on the front surface of the drive unit arrangement 10, but is rotated about 180° around the longitudinal axis X compared to the first configuration.

The first junction box 28a comprises a first control port 36a and a second control port 38a arranged on opposed sides. In the first configuration, as can be gathered from FIGS. 9 to 11, a first plug connector 32a of a first connecting element 30a is coupled to the first control port 36a. In the second configuration, as can be gathered from FIGS. 13 to 15, the first plug connector 32a of the first connecting element 30a is coupled to the second control port 38a of the first junction box 28a.

The second junction box 28b is coupled to a second connecting element 30b via a first control port 36b. This connection is established in both the first and the second configuration depicted in FIGS. 11 and 15.

Further, the second junction box 28b comprises a first and a second sensor port 48, 50, each of which is configured to be coupled to a sensor line 44, i.e. provided in the form of an electric cable for communicatively connecting a first sensor provided in the gearbox 16 to the second junction box 28b. Further, a fifth and a sixth sensor port 60, 62 are provided at the second junction box 28b, each of which is configured to be coupled to a further sensor line 56, i.e. a hydraulic line, so as to fluid-communicatively connect a second sensor accommodated in the second junction box 28b to the gearbox 16.

Figure 9:
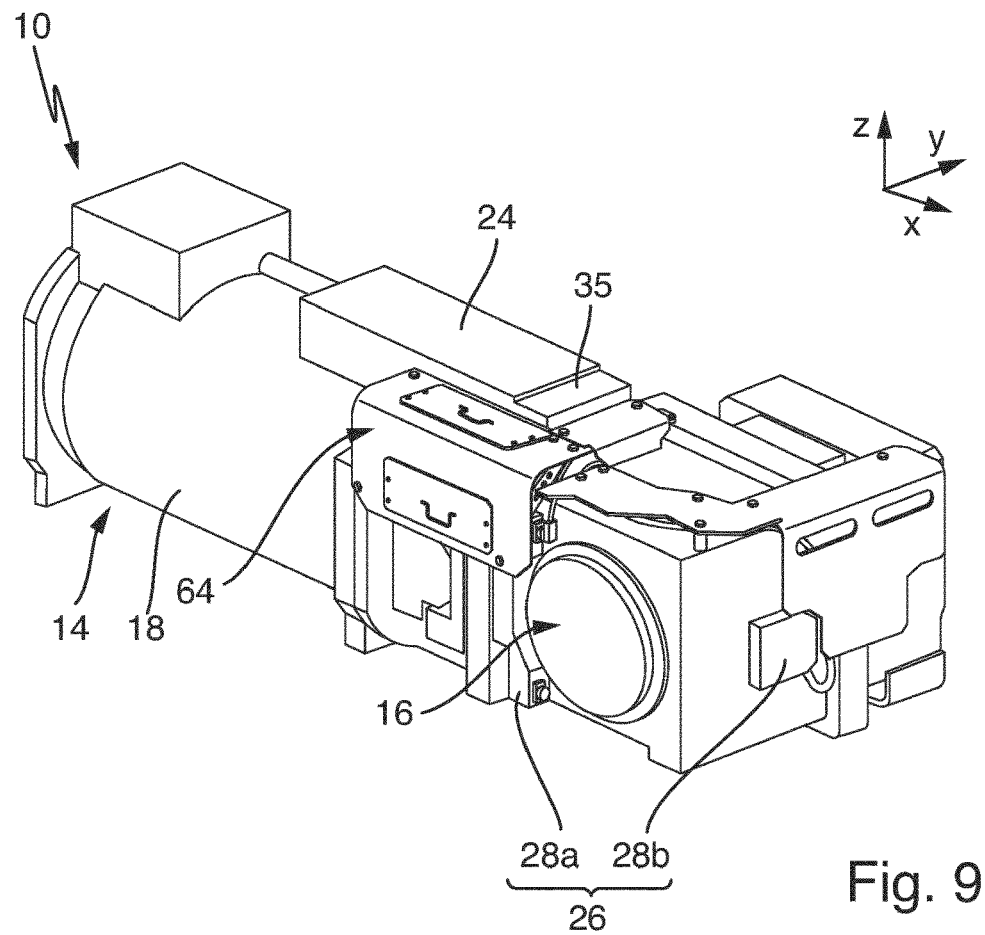
FIGS. 9 to 12 schematically shows a perspective view of a drive unit arrangement according to a second embodiment which is equipped with a drive unit of a first structural arrangement and an electric terminal assembly arranged in a first configuration.
Figure 10:
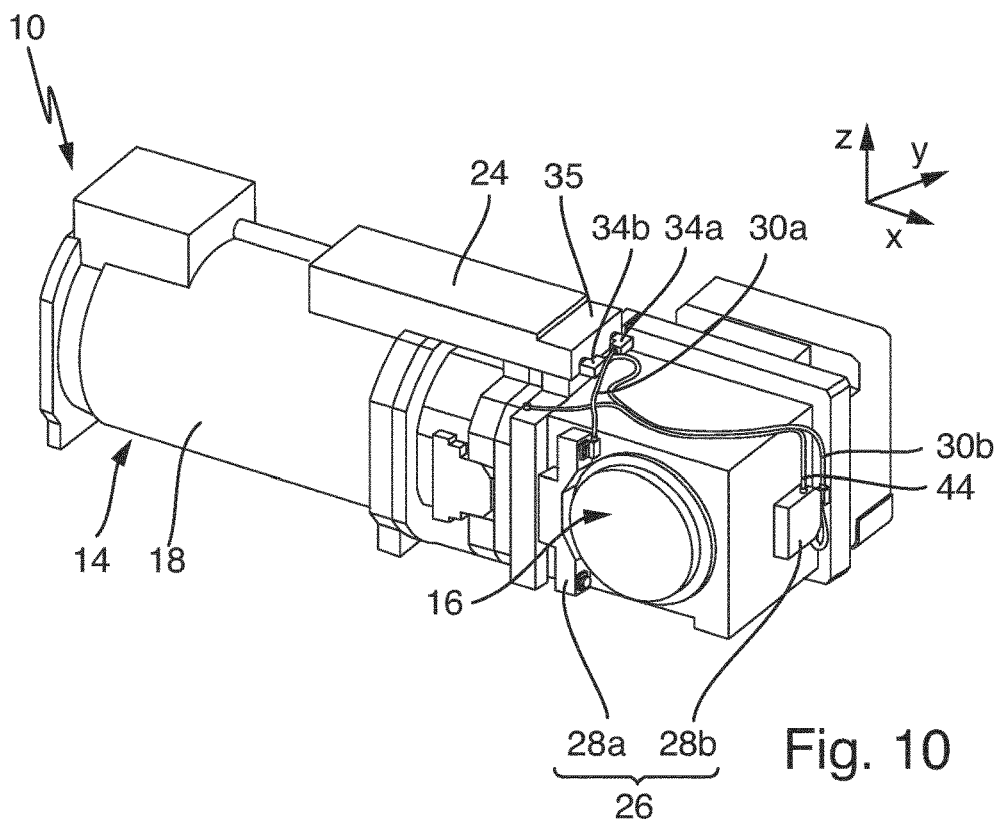
Figure 11:
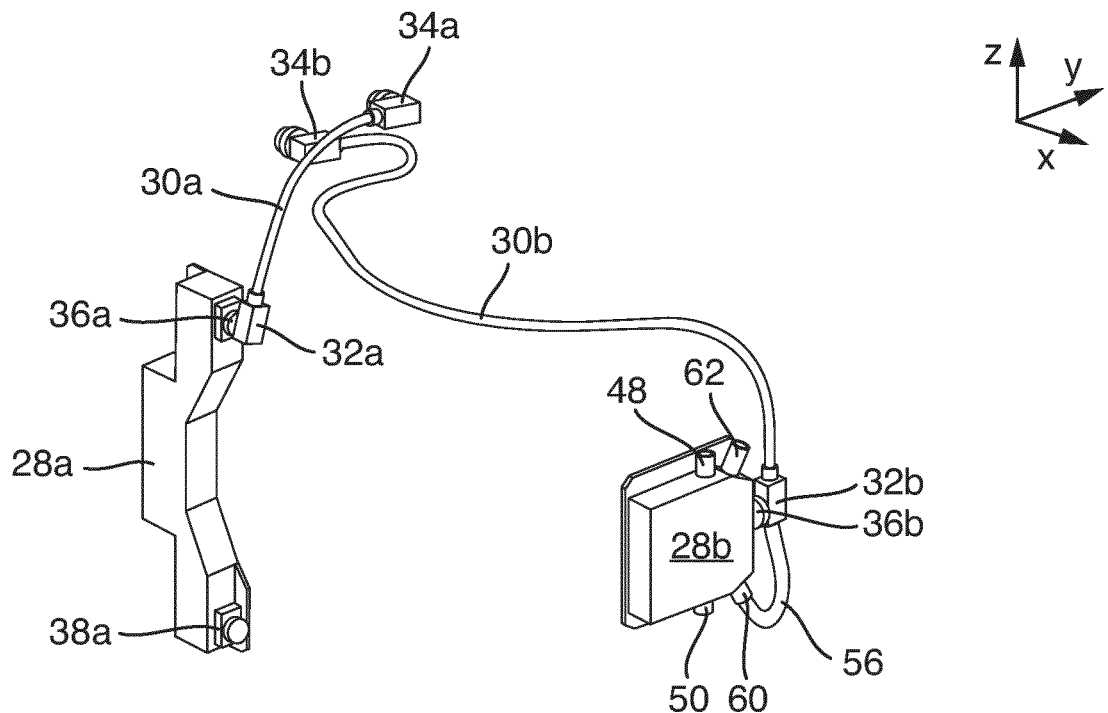
Figure 12:
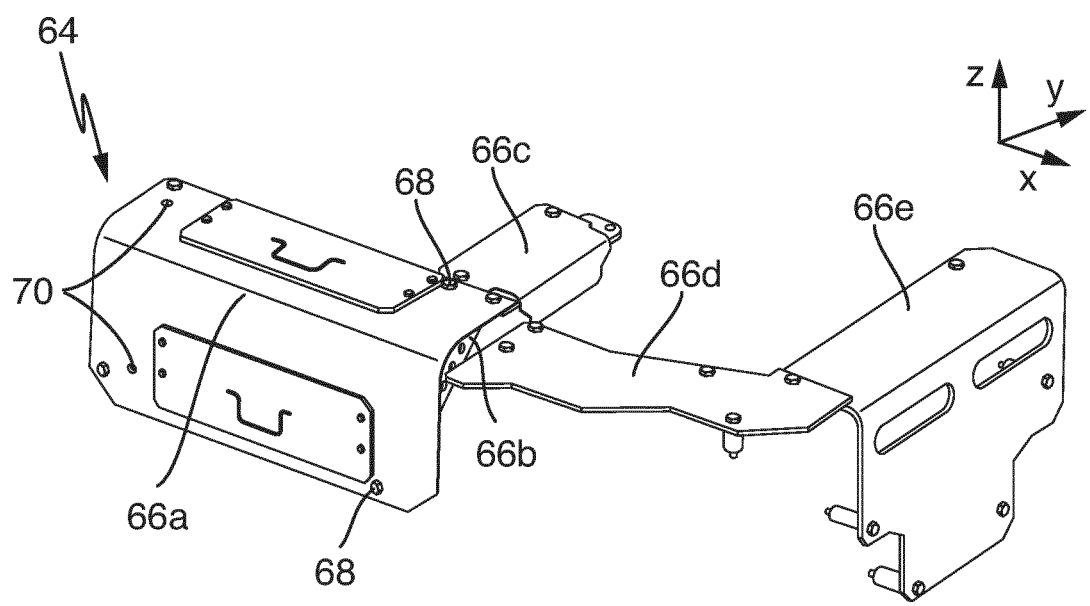

In the first configuration, as can be gathered from FIGS. 9 to 11, the sensor line 44 is coupled to the first sensor port 48 and the further sensor line 56 is coupled to the fifth sensor port 60. However, in the second configuration depicted in FIGS. 13 to 15, the sensor line 44 is coupled to the second sensor port 50 and the further sensor line 56 is coupled to the sixth sensor port 62.

Figure 17:
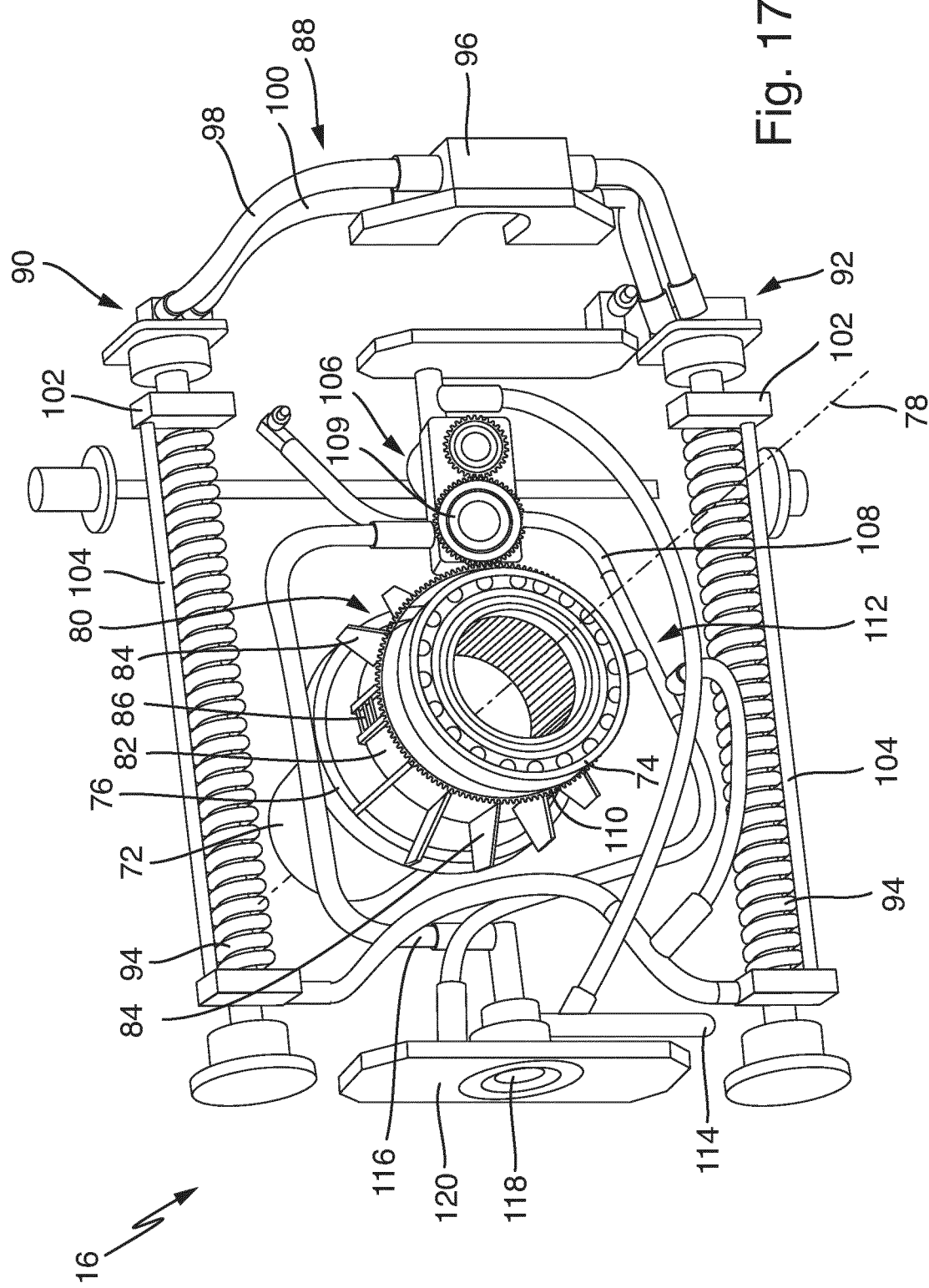
FIG. 17 schematically shows a perspective view of an inner structure of a gearbox according to a first configuration installed in the drive unit.

In the following, the gearbox 16 is further specified with reference to FIG. 17 which schematically shows an inner structure of the gearbox 16 according to a first configuration. For overview reasons, FIG. 17 shows merely a part of the gearbox's components, while other parts, such as a housing of the gearbox 16, a planetary gearing, etc., are omitted in the illustration. In FIG. 17, the gearbox 16 is shown in a mounted state, in which the gearbox 16 together with the drive unit 12 is installed in the mining machine.

As set forth above, the shown gearbox 16 is installed and used in the drive unit 12 provided as a P-arrangement drive unit, but may also be provided a KP-arrangement drive unit. Such a drive unit 12 further comprises the motor unit 14 having the electric motor 18 which is provided in the form of an inverter-fed synchronous machine equipped with permanent magnets. Specifically, the electric motor may be provided such that, at its nominal operating point, it is operated at less than 1400 rpm or 1300 rpm or 1000 rpm, e.g. between 1000 rpm to 200 rpm or between 400 rpm to 200 rpm or between 350 rpm to 250 rpm, in particular about 300 rpm.

The gearbox 16 comprises an input shaft 72, to which an actuating torque generated by the electric motor 18 is applied. The gearbox 16 is configured to provide speed and torque conversion from its actuated input shaft 72 to its output shaft. Specifically, the gearbox 16 is designed to provide a gear ratio between 3 to 15. For doing so, the gearbox 16 is provided in the form of a single-stage planetary gearing, in which the input shaft 72 is fastened to a sun gear and the output shaft is fastened to a planet gears carrier of the planetary gearing.

As can be gathered from FIG. 17, the input shaft 72 of the gearbox 16 is received in a first and a second bearing 74, 76 so as to be rotatably mounted to the housing of the gearbox 16. With such an arrangement, the input shaft 72 can be rotatably actuated around its longitudinal axis 78.

The housing (not shown) of the gearbox 16 accommodates the moving parts of the gearbox, i.e. the planetary gearing. Further, the housing delimits a lubricant sump, also referred to as a lubricant reservoir, in which a lubricant, e.g. oil, is received. The lubricant, on the one hand, is used to reduce friction between the moving parts of the gearbox 16 and, on the other hand, to effectively dissipate heat from the gearbox 16, i.e. its moving parts. For doing so, the gearbox 16 is provided such that, during its operation, i.e. upon rotating the input shaft 72, the moving parts, e.g. the input shaft 72, planetary gears, the ring gear, etc., at least partly, are immersed into and guided through the lubricant received in the lubricant sump. Specifically, the lubricant sump is provided such that the input shaft 72, at least partly, is immersed or positioned into the lubricant received in the lubricant sump. For doing so, the gearbox 16 is provided such that, in its mounted or operating state, the longitudinal axis 78 of the input shaft 72, around which it is rotationally actuated, is arranged substantially parallel to and in the vicinity or region of a surface of the lubricant received in the lubricant sump.

As can be gathered from FIG. 17, the gearbox 16 further comprises a paddle element 80 which is attached to the input shaft 72. In the context of the present disclosure, the term "paddle element" refers, for example, to a paddle-shaped component of the gearbox which is intended and configured for pushing against the lubricant received in the housing of the gearbox 16 in order to induce a movement thereof. Such a paddle-shaped component is usually provided with an effective surface for pushing the lubricant. The effective surface may be designed so as to be guided through the lubricant in a direction that is substantially perpendicular to its surface normal.

Accordingly, the paddle element 80 is configured for setting lubricant received within a housing of the gearbox 16 in motion upon actuation of the input shaft 72. For doing so, the gearbox 16 is arranged such that, during operation of the gearbox 16, i.e. upon rotating the input shaft 72, the paddle element 80 is configured to at least partially immerse into the lubricant received in the lubricant sump. In other words, upon rotating the input shaft 72, the paddle element 80 may be actuated such that at least a part thereof is guided through the lubricant received in the lubricant sump, thereby inducing a movement, i.e. a circulation, of the lubricant received in the lubricant sump.

As can be gathered from FIG. 17, the paddle element 80 is provided in the form of a paddle wheel arranged circumferentially and coaxially around an outer surface of the input shaft 22 between the first and the second bearing 74, 76. In this configuration, the paddle element 80 has a ring element 82, around which a plurality of blades 84, also referred to as paddles, are set. Each one of the plurality of blades 84 is provided in the form of a prism having a cross-sectional profile in the form of a trapezoid. Each one of the two front surfaces of the blades 84, at least one of which constitutes an effective surface, substantially extends in a plane spanned by the longitudinal axis 78 and a radial axis of the drive shaft 72.

Further, the paddle element 80 is formed in multiple pieces which are releasably fastened to one another. Specifically, the ring element 82 is provided with two junctions 86 arranged on opposed sides of the ring element 82 for releasably connecting two parts or halves of the paddle element 80. Each one of the two junctions 86 is formed by two connecting pins which are received in opposing end sections of the two parts of the paddle element 80.

Further, the gearbox 16 is provided with a lubricant cooling system 88 for cooling the lubricant received in the gearbox 16 by dissipating heat from the lubricant to a cooling medium. The lubricant cooling system 88 comprises a first lubricant cooler unit 90 and a second lubricant cooling unit 92 which are arranged on opposed sides within the housing of the gearbox 16. Specifically, the first lubricant cooler unit 90 is arranged in an upper or ceiling area of the housing and the second lubricant cooler unit 92 is arranged in a lower or bottom area of the housing. Accordingly, the first lubricant cooler unit 90 is arranged outside of the lubricant sump within the housing, while the second lubricant cooler unit 92 is arranged within the lubricant sump and thereby immersed into the lubricant.

Each one of the first and the second lubricant cooler units 90, 92 is provided with a heat exchanger 94 through which a cooling medium, i.e. cooling water, is guided. The heat exchanger 94 is provided in the form of a helical cooling pipe having a supply opening and discharge opening for the cooling medium which are connected to a cooling medium manifold 96 via a cooling medium supply and discharge line 98, 100.

Further, the first and the second lubricant cooler unit 90, 92 are provided with a spray unit 102 configured to spray lubricant onto the associated heat exchanger 94. The spray unit 102 comprises a pipe-shaped spray element 104 which extends in parallel to the associated heat exchanger 94 and which is provided with a plurality of discharge opening facing the associated heat exchanger 94. As can be gathered from FIG. 17, the spray element 104 is arranged alongside and in the vicinity of the associated heat exchanger 94.

Further, the spray unit 102 of each one of the first and the second lubricant cooler unit 90, 92 is connected to a lubrication pump 106, also referred to as the "pump" in the following, via a lubricant feed line 108 so as to supply the spray element 104 with lubricant received in the lubricant sump. The pump 106 is driven or actuated by a rotational movement of the drive shaft 72. For doing so, the pump 106 comprises an idler gear 109 which is designed complementary to and engaged with a pump drive gear 110 arranged circumferentially around the input shaft 72.

Prior to being supplied to the spray elements 104, the lubricant conveyed by the pump 106, at first, is guided through a distribution part 112 which distributes the lubricant conveyed by the pump 106 to different components of the gearbox 16. In this way, the lubricant conveyed by the pump 106 is further supplied, inter alia, to the second bearing 76 which is fluid-communicatively connected to the distribution part 112.

For collecting lubricant to be guided to the pump 106, a suction piece 114 is provided, to which the pump 106 is connected via a lubricant collecting line 116. The suction piece 114 is provided such that it at least partly immerses into the lubricant received in the lubricant sump. In this way, at least one suction opening is positioned in the lubricant sump so as to collect lubricant and guide it towards the pump 106.

Further, the suction piece 114 is configured to be arranged into at least two different positions relative to the housing. Specifically, the suction piece 114 is pivotally mounted to the housing around a joint which extends substantially perpendicular to the longitudinal axis 78 of the input shaft 72. In this way, the lubricant cooling system 88 can be adapted to different mounting conditions of the gearbox 16 in the drive unit 12, thereby providing a certain degree of configurability. For example, if the gearbox 12 is positioned into a different mounting position, in which it is displaced around the longitudinal axis 78 about 180° relative to the condition depicted in FIG. 17, the suction piece 114 may be rotated around the joint about 180° such that the suction piece 114, again, points towards a bottom of the gearbox, thereby ensuring that the suction element 114 immerses into the lubricant sump.

For ensuring that the suction piece 114 is properly positioned within the gearbox 16, the housing is provided with a releasable cap 118 and a cover element 120, to which the suction piece 114 together with the joint is fastened. By such a configuration, by releasing the cap 118 or the cover element 120, the suction piece 114 may be exposed to an operator so as to facilitate proper positioning of the suction piece 114 during an assembly or maintenance process.

In the following, with reference to FIGS. 18 and 19, further configurations of the gearbox 16 are disclosed which provide for a further aspect of the present disclosure. It is noted that the features disclosed with reference to the configuration of the gearbox 16 depicted in FIG. 17 may be combined with the features described in the following with reference to the further configurations of the gearbox 16. In other words, the gearboxes 16 depicted in FIGS. 18 and 19 may be provided with a paddle element 80 and a lubricant cooling system 88 as disclosed above.

Figure 18:
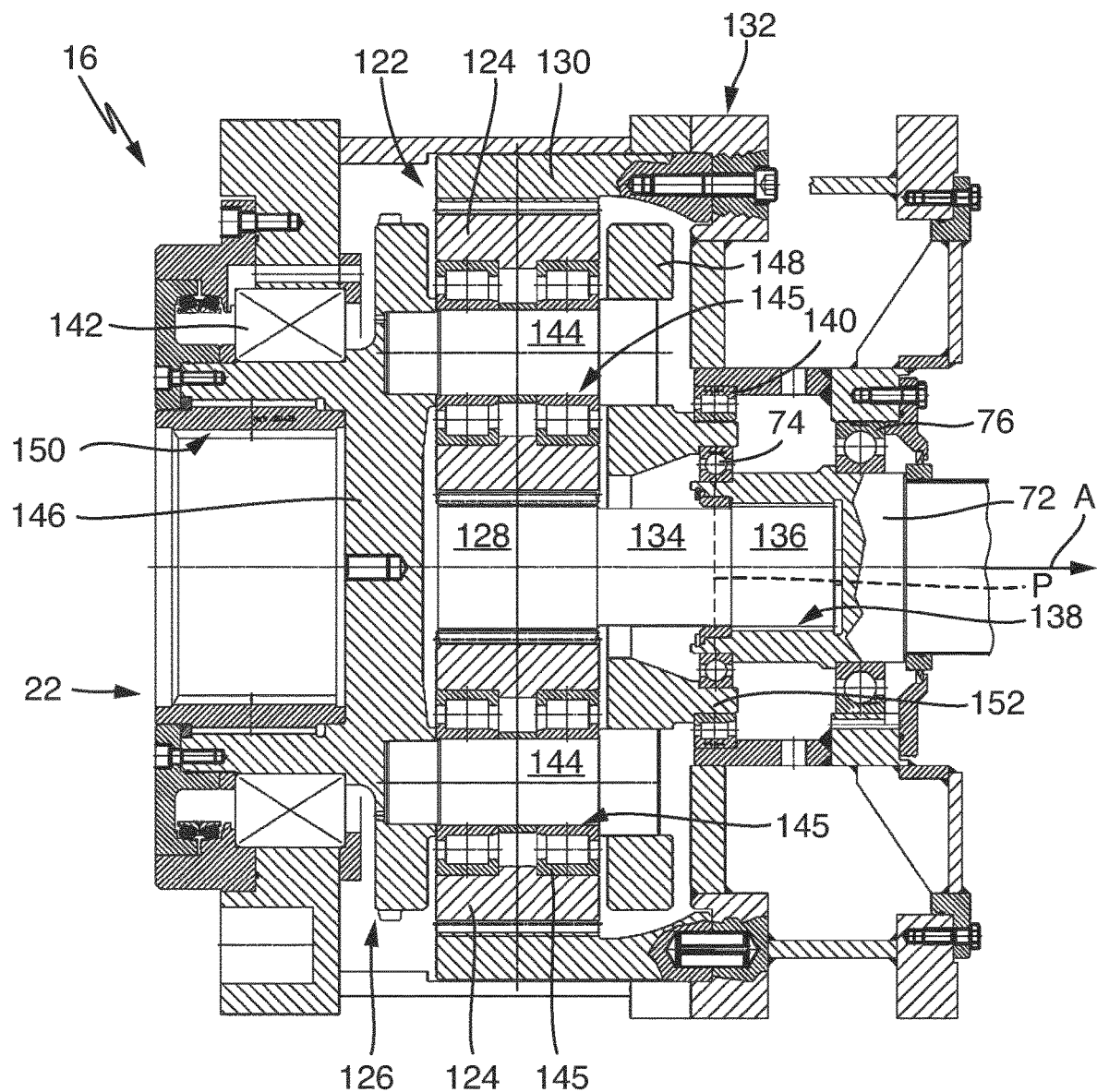
FIG. 18 schematically shows a longitudinal section of a gearbox according to a second configuration.

FIG. 18 shows a gearbox 16 in the form of a single-stage planetary gearing. The shown gearbox 16 is installed and used in the drive unit 12 provided as a P-arrangement drive unit, for example as depicted in FIGS. 1 and 5. In such an arrangement, the input shaft 72 and the output shaft 22 of the gearbox 16 are parallel, in particularly coaxially aligned, as can be gathered from FIG. 18. Such a gearbox arrangement may also be referred to as an in-line planetary gearbox.

The drive unit 12, in which the gearbox 16 is included, comprises the motor unit 14 having the electric motor 18 which is connected to the input shaft 72 of the gearbox 16 in a torque-transmitting manner so as to rotatably actuate the input shaft 72. In other words, by means of the input shaft 72, an actuation torque generated by the motor unit 14 is introduced into the gearbox 16. For doing so, a drive shaft of the motor 18 is form- and/or force-fittingly coupled, e.g. directly coupled to the input shaft 72 of the gearbox 16.

The gearbox 16 is designed to provide a gear ratio between 3 to 15. For doing so, the gearbox 16 has a planetary gear assembly 122 interconnecting the input shaft 72 and the output shaft 22 of the gearbox 16 in a torque-transmitting manner. In this way, an input torque applied to the input shaft 72 is converted into an output torque acting on the output shaft 22. The output torque may be 3 to 15 times greater than the input torque. Accordingly, during operation of the gearbox 16, a rotational speed of the input shaft 72 is 3 to 15 times greater than a rotational speed of the output shaft 22.

The planetary gear assembly 122 comprises a plurality of planet gears 124 which are carried by a planet gear carrier 126 and which are guided between a sun gear 128 and a ring gear 130. In the shown configuration, the sun gear 128, the planet gears 124 and the planet gear carrier 126 constitute moving parts accommodated within a housing 132 of the gearbox 16. In other words, during operation of the gearbox 16, these parts are rotated relative to the housing 132, wherein the ring gear 130 is firmly mounted to the housing 132 and thus fixed relative thereto, as can be gathered from FIG. 18.

The input shaft 72 of the gearbox 16 is configured to introduce an actuating torque to the sun gear 128. In other words, the input torque received by the input shaft 72 from the drive shaft of the motor 18 is transmitted and introduced to the sun gear 128. For doing so, the input shaft 72 is connected to the sun gear 128 in a torque-transmitting manner. In the shown configuration, the sun gear 128 comprises a connecting shaft 134 being provided with an engagement section 136 which is form-fittingly connected to the input shaft 72. In other words, the connecting shaft 134 forms a part of the sun gear 128. Alternatively or additionally, the sun gear 128 may be force-fittingly connected to the input shaft 72 of the gearbox. As can be gathered from FIG. 18, the input shaft 72 is provided with an engagement recess 138, into which the engagement section 136 of the sun gear 128 is received. The engagement section 136 is designed complementary to and engaged with the engagement recess 138 so as to form a keyed joint between the sun gear 128 and the input shaft 72. In this way, a relative rotation between these two parts is prevented so as to enable torque transmission from the input shaft 72 to the sun gear 128, while a relative axial movement along an axial direction A of the planetary gear assembly 122 between these two parts may be allowed.

For being rotatably movable relative to the housing 132, the sun gear 128 is rotatably supported in the gearbox 16 by means of the first bearing 74 and the further first bearing 76 which are attached to the outer surface of the input shaft 72. As can be gathered from FIG. 18, the first and the further first bearing 74, 76 are provided in the form of a roller bearing, in particular a radial ball bearing, which are arranged at a distance from one another along the axial direction A. Specifically, in the shown configuration, the first and the further first bearing 74, 76 constitute a floating bearing for rotatably supporting the input shaft 72 together with the sun gear 128 in the housing 132 of the gearbox 16. In other words, by being keyed-jointly connected to the input shaft 72, the sun gear 128 is rotatably supported in the housing 132 of the gearbox 16 around a rotational axis which coincides with the axial direction A.

The planetary gear assembly 122 comprises a plurality of planet gears 124, e.g. four planet gears 124, which are set around and engaged with the sun gear 128. The planet gears 124 are further engaged with the ring gear 130 and thus positioned between the sun gear 128 and the ring gear 130. Each one of the planet gears 124 is rotatably mounted to the planet gear carrier 126 so as to be rotatably movable around its longitudinal axis relative to the planet gear carrier 126. To that end, the planet gear carrier 126 is rotatably supported in the gearbox 16, in particular in the housing 132, by means of a second bearing 140, also referred to as a "first planet carrier bearing", and a further second bearing 142, also referred to as a "second planet carrier bearing". In this way, the planet gear carrier 126 is rotatable relative to the housing 132 around a rotational axis which coincides with the axial direction A.

The planet gear carrier 126 is made of at least two pieces which are structurally coupled by means of a plurality of planet pins 144, each of which supports one of the planet gears 124. Specifically, the planet gears 124 are rotationally mounted to associated planet pins 144 by means of a bearing arrangement 145 which constitutes a floating bearing arrangement having two mirrored NJ design cylindrical roller bearings, as can be gathered from FIG. 18.

When viewed from the output shaft 22 in direction to the input shaft 72, i.e. in the axial direction A, a first section 146 of the planet gear carrier 126 is arranged in front of the planet gears 124 and the sun gear 128, wherein a second section 148 of the planet gear carrier 126 is arranged behind the planet gears 124 and around the sun gear 128, in particular around the connecting shaft 134 thereof. The first section and the second section 146, 148 form an integral component. The first section 146 of the planet gear carrier 126 forms the output shaft 22 which is provided with a coupling recess 150 for receiving and form-fittingly connecting the planet gear carrier 126 to a drive shaft of an operating equipment, e.g. by forming a keyed joint between the coupling recess and the drive shaft of the operating equipment.

The second section 148 of the planet gear carrier 126 comprises a hollow cylindrically-shaped support element 152 which is arranged around the sun gear 128, i.e. around the connecting shaft 134 thereof. In other words, the sun gear 128 is received within and coaxially arranged to the second section 148, i.e. its support element 152.

As set forth above, the planet gear carrier 126 is rotatably supported in the housing 132 of the gearbox 16 by means of the second and the further second bearing 140, 142. Specifically, the second bearing 140 is attached to an outer surface of the support element 152, wherein the further second bearing 142 is attached to an outer surface of the first section 146 of the planet gear carrier 126, i.e. to a cylindrically-shaped outer surface thereof. By such a configuration, the second and the further second bearing 140, 142 are arranged on opposed sides, i.e. along the axial direction A, relative to the planet gears 124 of the planetary gear assembly 122. In the shown configuration, the second bearing 140 provided in the form of a cylindrical roller bearing, in particular a NJ design cylindrical roller bearing. The further second bearing 142 is provided in the form of a roller bearing, in particular in the form of a double row tapered roller bearing.

In the following, the arrangement and configuration of the first and the second bearing 74, 140 are further specified. As can be gathered from FIG. 18, the gearbox 16 is provided such that the first bearing 74 for supporting the sun gear 128 received in the input shaft 72 and the second bearing 140 for supporting the planet gear carrier 126 at least partly overlap in the axial direction A of the planetary gear assembly 122. In other words, when viewed from a radial direction of the sun gear 128 or the input shaft 72, i.e. which extends perpendicular to the axial direction A, the first bearing 74 and the second bearing 140 are arranged in succession such that the first bearing 74 at least partly covers the second bearing 140. Specifically, as can be gathered from FIG. 18, the first and the second bearing 74, 140 overlap in the axial direction A along the whole length of the first bearing 74, i.e. along its extension in the axial direction A.

Further, the first bearing 74 and the second bearing 140 are arranged coaxially. In other words, an axial or longitudinal axis of the first bearing 74 coincides with an axial or longitudinal axis of the second bearing 140. In this way, the first bearing 74 is accommodated within the second bearing 140, i.e. within a space delimited by the second bearing 140. In other words, the second bearing 140 encapsulates the first bearing 74. Further, the first and the second bearing 74, 140 are provided such that their axial or longitudinal axis coincide with the axial direction A of the planetary gear assembly 122, respectively.

As set forth above, the first and the second bearing 74, 140 are provided in the form of roller bearings. Such bearings, generally, comprise an inner and an outer ring raceway delimiting a guiding groove for accommodating and guiding rolling elements, e.g. in the form of ball or cylinder elements. In such an arrangement, the bearings are subjected to a force exerted by the load acting upon the bearing, i.e. its rolling element and its raceways. Typically, this force may be characterized by an effective force line of the load acting upon the rolling element. In this context, the term "effective force line" generally refers to the direction of a cumulative load acting on the rolling element of the bearing. In other words, the effective load line indicates a direction of loading acting upon a rolling element of the bearing. For example, in ball bearings, the effective force line constitutes a line joining the point of contact of the ball element and the raceways in a radial plane, along which a load is transmitted from one raceway to another via the ball element.

In the shown configuration, the effective force lines of the first and the second bearing 74, 140 are arranged in a plane P which is perpendicular to the axial direction A of the planetary gear assembly 122. In other words, both the effective force lines of the first and the second bearing 74, 140 extend in a direction perpendicular to the axial direction A of the planetary gear assembly 122.

As can be gathered from FIG. 18, the first bearing 74 is interposed between the sun gear 128, i.e. the input shaft 72, and the planet gear carrier 126, i.e. its hollow cylindrical support element 152. Specifically, the first bearing 74 is fastened to a circumferential inner surface of the support element 152 and to the circumferential outer surface of the input shaft 72. In particular, an outer ring raceway of the first bearing 74 is attached to the inner surface of the support element 152, wherein an inner ring raceway of the first bearing 74 is attached to the outer surface of the input shaft 72.

The second bearing 140 is interposed between the housing 132 and the planet gear carrier 126, i.e. its hollow cylindrical support element 152. Specifically, the second bearing 140 is fastened to a circumferential outer surface of the support element 152 and to a circumferential inner surface of the housing 132. In particular, an outer ring raceway of the second bearing 140 is attached to the inner surface of the housing 142, wherein an inner ring raceway of the second bearing 140 is attached to the outer surface of the support element 152.

Figure 13:
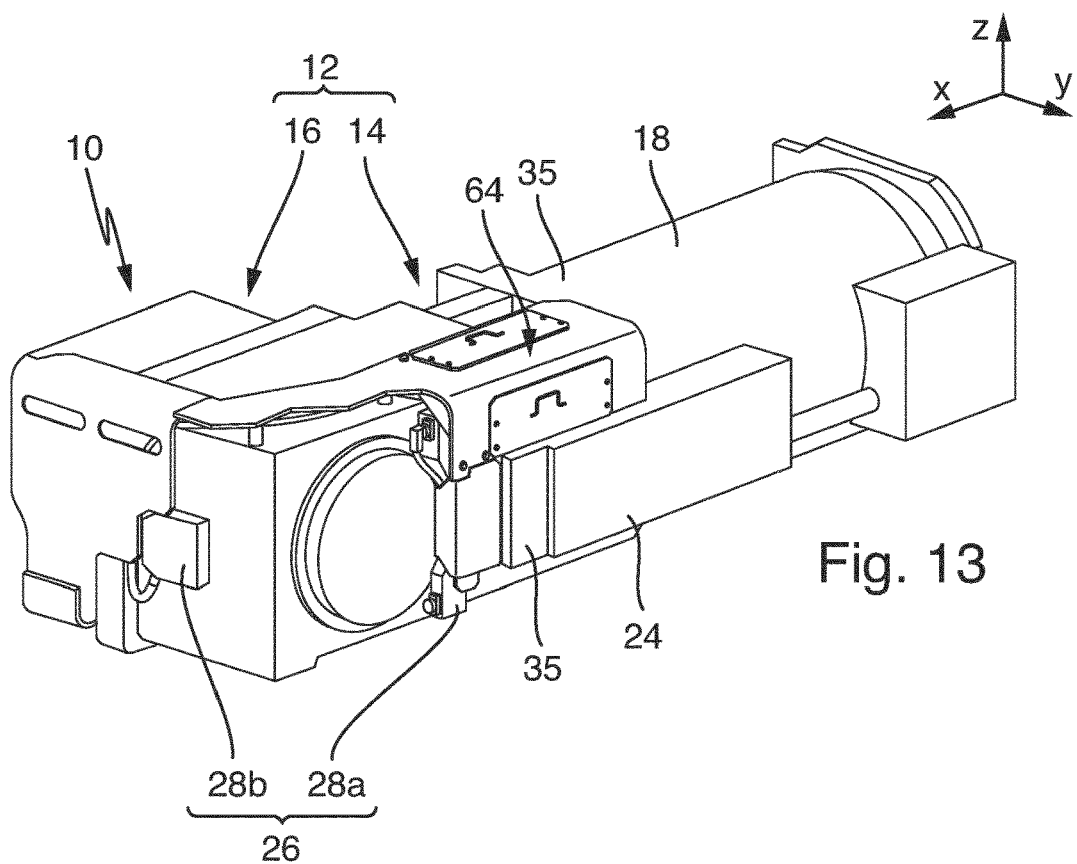
FIGS. 13 to 16 schematically illustrate the drive unit arrangement depicted in FIG. 9, in which the drive unit is configured in a second structural arrangement and the electric terminal assembly is arranged in a second configuration.
Figure 14:
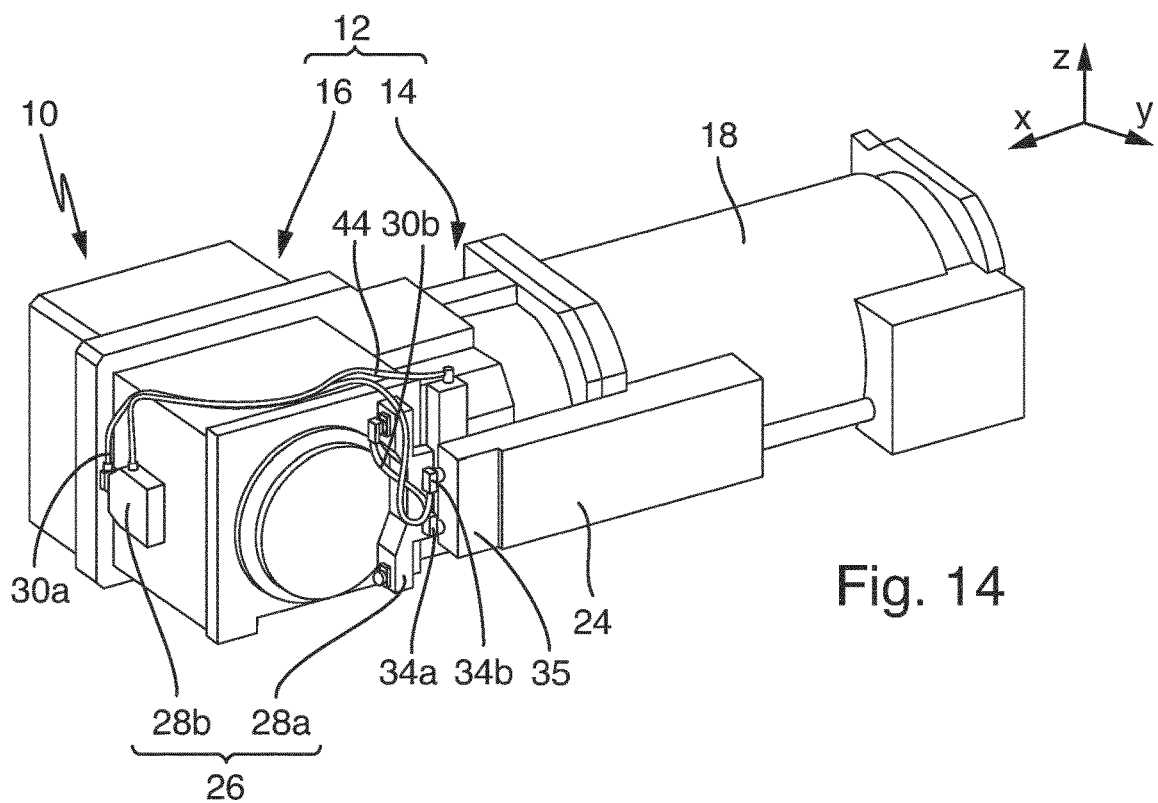
Figure 15:
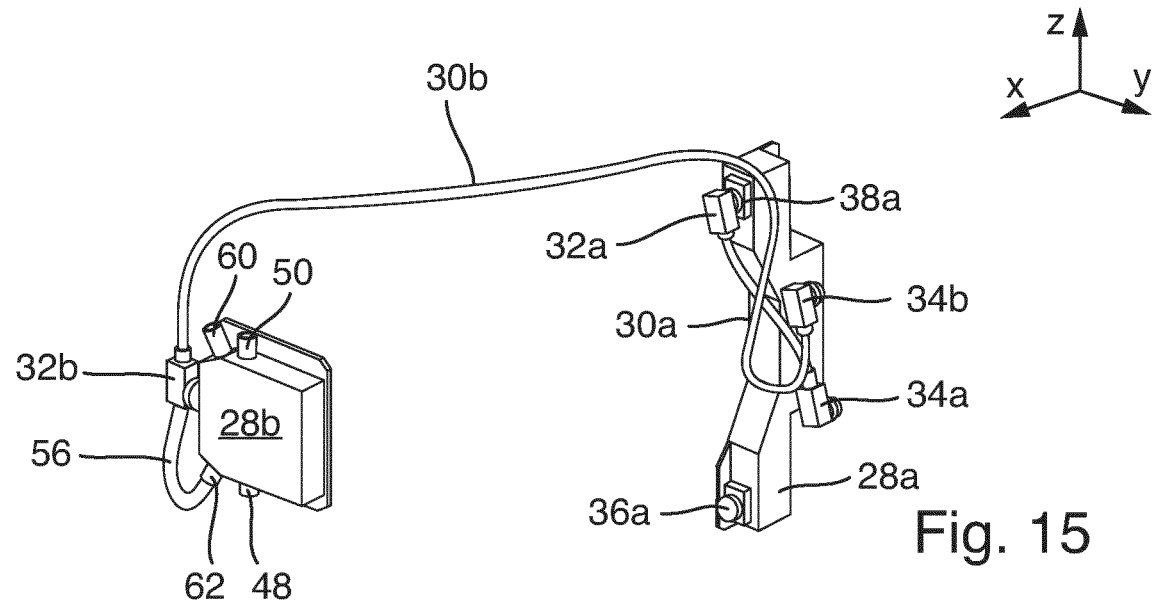
Figure 16:
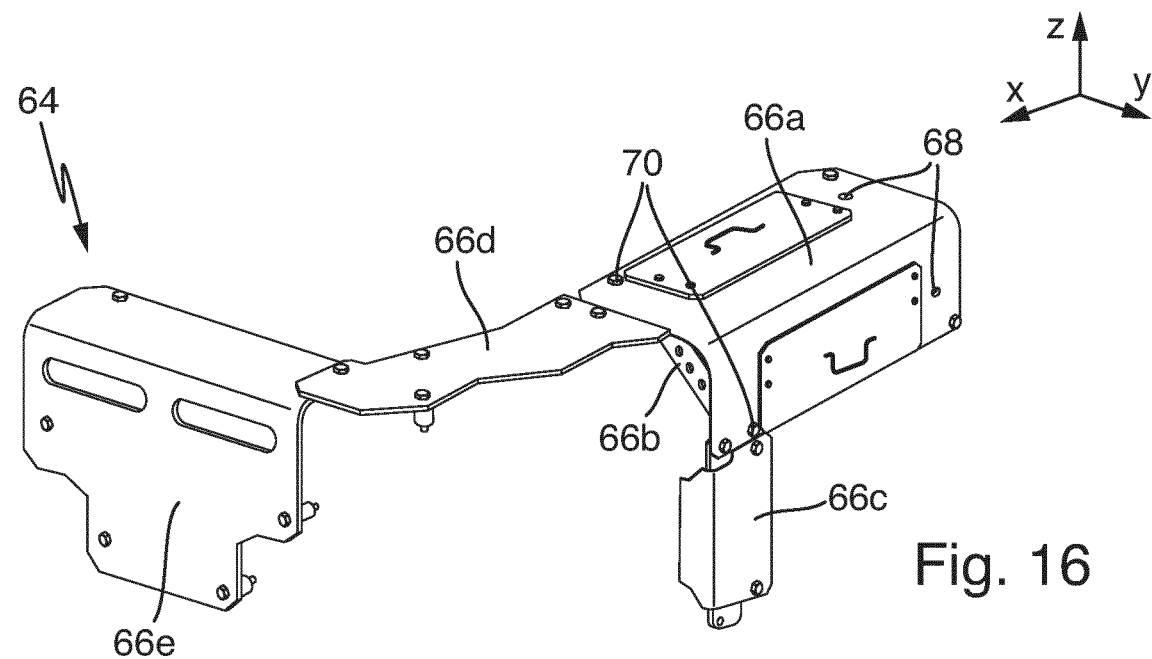
Figure 19:
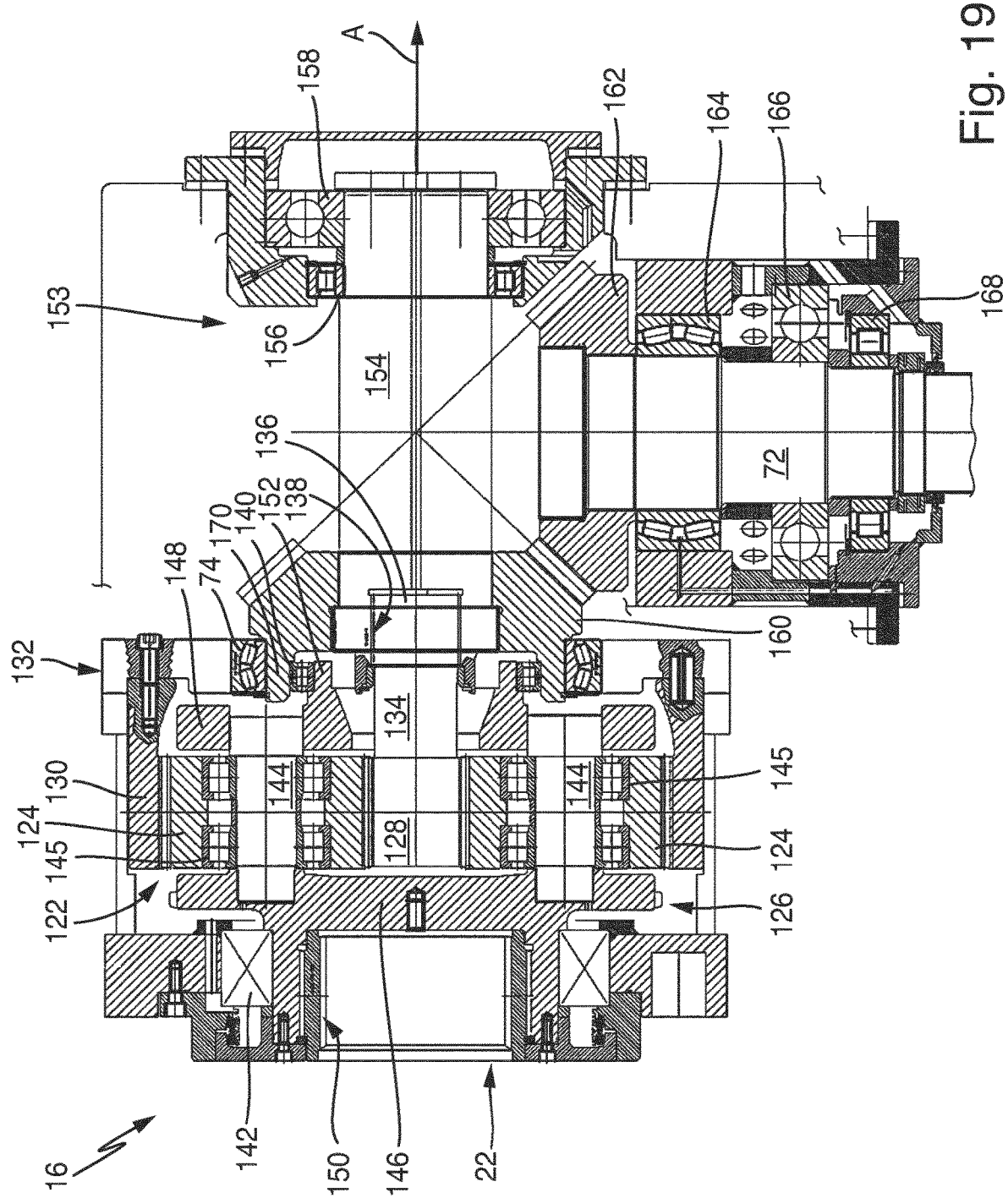
FIG. 19 schematically shows a longitudinal section of a gearbox according to a third configuration.

FIG. 19 shows a gearbox 16 according to a further configuration. The shown gearbox 16 is installed and used in the drive unit 12 provided as a KP-arrangement drive unit, e.g. as depicted in FIGS. 9 and 13. In such an arrangement, the input shaft 72 and the output shaft 22 of the gearbox 16 are arranged perpendicular to one another. Such a gearbox arrangement may also be referred to as a bevel planetary gearbox.

Compared to the arrangement depicted in FIG. 18, in the gearbox 16 shown in FIG. 19, the input shaft 74 and the sun gear 128 are not directly coupled to one another. Rather, a bevel gear arrangement 153 is interposed therebetween so as to mechanically couple the input shaft 74 to the sun gear 128 in a torque-transmitting manner.

The bevel gear arrangement 153 comprises an intermediate shaft 154 which is mechanically coupled to both the sun gear 128 and the input shaft 72. Specifically, the intermediate shaft 154 is provided with an engagement recess 138 for receiving the engagement section 136 of the sun gear 128 and for providing a keyed joint between these two components. The sun gear 128 and the intermediate shaft 154 are coaxially arranged. The intermediate shaft 154 and thus the sun gear 128 which is hold and fixed therein are rotatably supported in the housing 132 of the gearbox 16 by means of the first bearing 74 and two further first bearings 156, 158. The first bearing 74 is provided in the form of a spherical roller bearing, in particular in the form of a double row spherical roller bearing, wherein the two further first bearings are provided by a NU design cylindrical roller bearing 156 and a four point bearing 158.

The intermediate shaft 154 further comprises a first bevel gear wheel 160 which is arranged at an end section thereof. Specifically, the first bevel gear wheel 160 is arranged circumferentially around the sun gear 128, i.e. its engagement section 136. The first bevel gear wheel 160 is designed complementary to and engaged with a second bevel gear wheel 162 provided at the input shaft 72 so as to mechanically couple the intermediate shaft 154 and thus the sun gear 128 to the input shaft 72 in a torque-transmitting manner. As can be gathered from FIG. 19, the input shaft 72 and the intermediate shaft 154, i.e. their rotational axes, are arranged perpendicular to one another, wherein a pitch angle of the first and the second bevel gear wheel 160, 162 is 45°.

The input shaft 72 is rotatably supported in the housing 132 of the gearbox 16 by means of a spherical roller bearing 164, a radial ball bearing 166 and a NU design cylindrical roller bearing 168. At a first end, the input shaft 72 is configured to be mechanically coupled to the drive shaft of the motor 18 in a torque-transmitting manner. At a second end which is opposed to the first end, the input shaft 72 is provided with the second bevel gear wheel 162.

As can be gathered from FIG. 19, the intermediate shaft 154 is further provided with a hollow-cylindrically-shaped further support element 170, to which the first bearing 74 is coupled. The further support element 170 extends from the first bevel gear wheel 160 along the axial direction of the intermediate shaft 154 towards the sun gear 128. As can be gathered from FIG. 19, the first bearing 74 is interposed between the housing 132 and the further support element 170. More specifically, the first bearing 74 is fastened to a circumferential inner surface of the housing 132 and to a circumferential outer surface of the further support element 170. In particular, an outer ring raceway of the first bearing 74 is attached to the inner surface of the housing 132, wherein an inner ring raceway of the first bearing 74 is attached to the outer surface of the further support element 170.

Further, as can be gathered from FIG. 19, the second bearing 140 is interposed between the planet gear carrier 126, i.e. its support element 152, and the intermediate shaft 154, i.e. its further support element 170. Specifically, the second bearing 140 is fastened to the circumferential outer surface of the support element 152 and to a circumferential inner surface of the further support element 170. In particular, an inner ring raceway of the second bearing 140 is attached to the outer surface of the support element 152, wherein an outer ring raceway of the second bearing 140 is attached to the inner surface of the further support element 170.

In this configuration, when viewed from a radial direction of the sun gear 128, the support element 152, the second bearing 140, the further support element 170, the first bearing 74 and the housing 132 are arranged in succession, i.e. one after the other.

As can be gathered from FIG. 19, the first bearing 74 and the second bearing 140 overlap in the axial direction A of the planetary gear assembly 122. Specifically, the first and the second bearing 74, 140 overlap in the axial direction A along a whole length of the second bearing 140. Further, the first and the second bearing 74, 140 are arranged coaxially, wherein the effective force lines of the first bearing 74 are parallel to the effective force lines of the second bearing 140, as indicated by dashed lines in FIG. 19.

In the following, the coupling between the motor unit 14 and the gearbox 16 is specified.

For structurally coupling the motor unit 14 to the gearbox 16 within the drive unit 12, a coupling flange 170 is provided which is depicted in FIGS. 20 to 23. Generally, the shown coupling flange 170 is intended and configured for being installed within a drive unit 12 of a mining machine as described above. The coupling flange 170 is configured for structurally coupling the motor unit 14 and the gearbox 16 to one another within the drive unit 12. In other words, in an assembled state of the drive unit 12, both the motor unit 14 and the gearbox 16 are fixed, i.e. firmly mounted, to the coupling flange 170. Specifically, the coupling flange 170 is provided such that, in the assembled state of the drive unit 12, it is interposed between the motor unit 14 and the gearbox 16. When viewed in direction of the longitudinal axis X of the drive unit 12, the gearbox 16, the coupling flange 170 and the motor unit 14 are arranged in succession, i.e. one after the other.

The motor unit 14 and the gearbox 16 are connected in a torque-transmitting manner such that the actuation torque exerted on the motor shaft of the motor unit 14 can be introduced into the gearbox via the input shaft 72 of the gearbox 16. For doing so, the motor unit 14 and the gearbox 16 are interconnected by a drive shaft which may be formed by at least one of the motor shaft and the input shaft 72.

The coupling flange 170 is provided with a through opening 172 which extends along a longitudinal axis L of the coupling flange 170. Accordingly, the coupling flange 170 is designed and provided such that, in the assembled state of the drive unit 12, the drive shaft interconnecting the motor unit 14 and the gearbox 16 in a torque transmitting manner is accommodated in and extends through the through opening 172. In other words, in the assembled state of the drive unit 12, the longitudinal axis L of the coupling flange is parallel to or coincides with a longitudinal axis of the drive unit 12 and coincides with a rotational axis or longitudinal axis of the drive shaft. Accordingly, in the assembled state of the drive unit 12, the drive shaft is supported in the drive unit 12 such that it can be rotated relative to a housing of the motor unit 14, the housing of the gearbox 16 and the coupling flange 170.

Further, the coupling flange 170 comprises a motor-unit-side end 174 which constitutes a motor-unit-side interface of the coupling flange 170 for structurally coupling, i.e. securing, the motor unit 14 to the coupling flange 170. Opposed to the motor-unit-side end 174, the coupling flange 170 is further provided with a gearbox-side end 176 which constitutes a gearbox-side interface of the coupling flange 170 for structurally coupling, i.e. securing, the gearbox 16 to the coupling flange 170 in a predefined position and orientation relative thereto.

Specifically, the shown coupling flange 170 constitutes a component of the drive unit 12 in the form of an adapter which is provided separately from the motor unit 14 and the gearbox 16 and which is configured for properly coupling the motor unit 14 to the gearbox 16. For doing so, the coupling flange 170 is motor-unit- and gearbox-specifically designed. In other words, the coupling flange 170 is associated to a specific combination of a motor unit and a gearbox. Further, the coupling flange 170 is configured to be interchangeably employed in the drive unit 12. In this way, the coupling flange 170 may be exchanged and replaced by another coupling flange, particularly in dependence on the motor unit 14 and the gearbox 16 to be used in the drive unit 12. Alternatively, the coupling flange 170 may be configured and designed such that it may be used in combination with different types of motor units 14 or gearboxes 16.

Specifically, the shown coupling flange 170 is configured for structurally coupling the motor unit 14 to the gearbox 16 in four different spatial arrangements relative to one another. In the context of the present disclosure, the term "spatial arrangement" refers to a relative arrangement between the motor unit 14 and the gearbox 16 i.e. with regard to their position and orientation relative to one another.

The coupling flange 170 is configured and designed such that, among the different spatial arrangements, the motor unit 14 and the gearbox 16 are arranged rotationally offset relative to one another. In other words, the coupling flange 170 is configured and designed such that, in a first assembled state in which the motor unit 14 and the gearbox 16 are coupled to the coupling flange 170 in a first spatial arrangement, the motor unit 14 and the gearbox 16 are arranged rotationally offset relative to one another in relation to each one of a second to a fourth assembled state in which the motor unit 14 and the gearbox 16 are coupled to the coupling flange 170 in a second to a fourth spatial arrangement, respectively. Specifically, the coupling flange 170 is configured such that, in any one of the first to the fourth assembled state, the motor unit 14 is rotated relative to the gearbox 16 around the longitudinal axis L of the coupling flange 170 in relation to any other one of the first to fourth assembled states. In the shown configuration, the coupling flange 170 is configured such that in any one of the first to fourth assembled state, the motor unit 14 is rotated relative to the gearbox 16 about 90° or 180° around the longitudinal axis L of the coupling flange 170 in relation to any other of the second to fourth assembled state, respectively.

For doing so, the coupling flange 170, by means of the motor-unit-side end 174, is configured for holding the motor unit 14 in four different mounting positions, among which the motor unit 14 is arranged rotationally offset relative to the coupling flange 170. In other words, when being positioned in a first mounted state in which the motor unit 14 is coupled to the coupling flange 170 in a first mounting position, the motor unit 14 is arranged rotationally offset relative to the coupling flange 170 in relation to any other one of a second to a fourth mounted state in which the motor unit 14 is coupled to the coupling flange 170 in a second to a fourth mounting position, respectively. Accordingly, the coupling flange 170 is configured such that, in the first mounted state, the motor unit 14 is rotated relative to the coupling flange about 90° or 180° around the longitudinal axis L of the coupling flange 170 in relation to any one of the second to the fourth mounted state.

More specifically, in the shown configuration, the coupling flange 170 is configured to limit the coupling of the motor unit 14 to the coupling flange 172 to the four different mounting positions, in each of which a relative orientation between the motor unit 14 and the coupling flange 170 is predefined. The predefined relative orientations between the motor unit 14 and the coupling flange 170 differ among the four different mounting positions.

Further, the coupling flange 170 is configured for holding the gearbox 16 by means of the gearbox-side end 176 in one single mounting position. In other words, the coupling flange 170 is configured to limit the coupling of the gearbox 16 to the coupling flange 170 to a single mounting position, in which a relative orientation between the gearbox 16 and the coupling flange 170 is predefined. Therefore, the gearbox-side end 176 of the coupling flange 170 is designed such that the gearbox 16 can be secured to the coupling flange 170 in only one single mounting position.

In the following, with reference to FIG. 22, the structural configuration of the motor-unit-side end 174 is specified which enables that the motor unit 14 can be secured to the coupling flange 170 into four different mounting positions.

Figure 22:
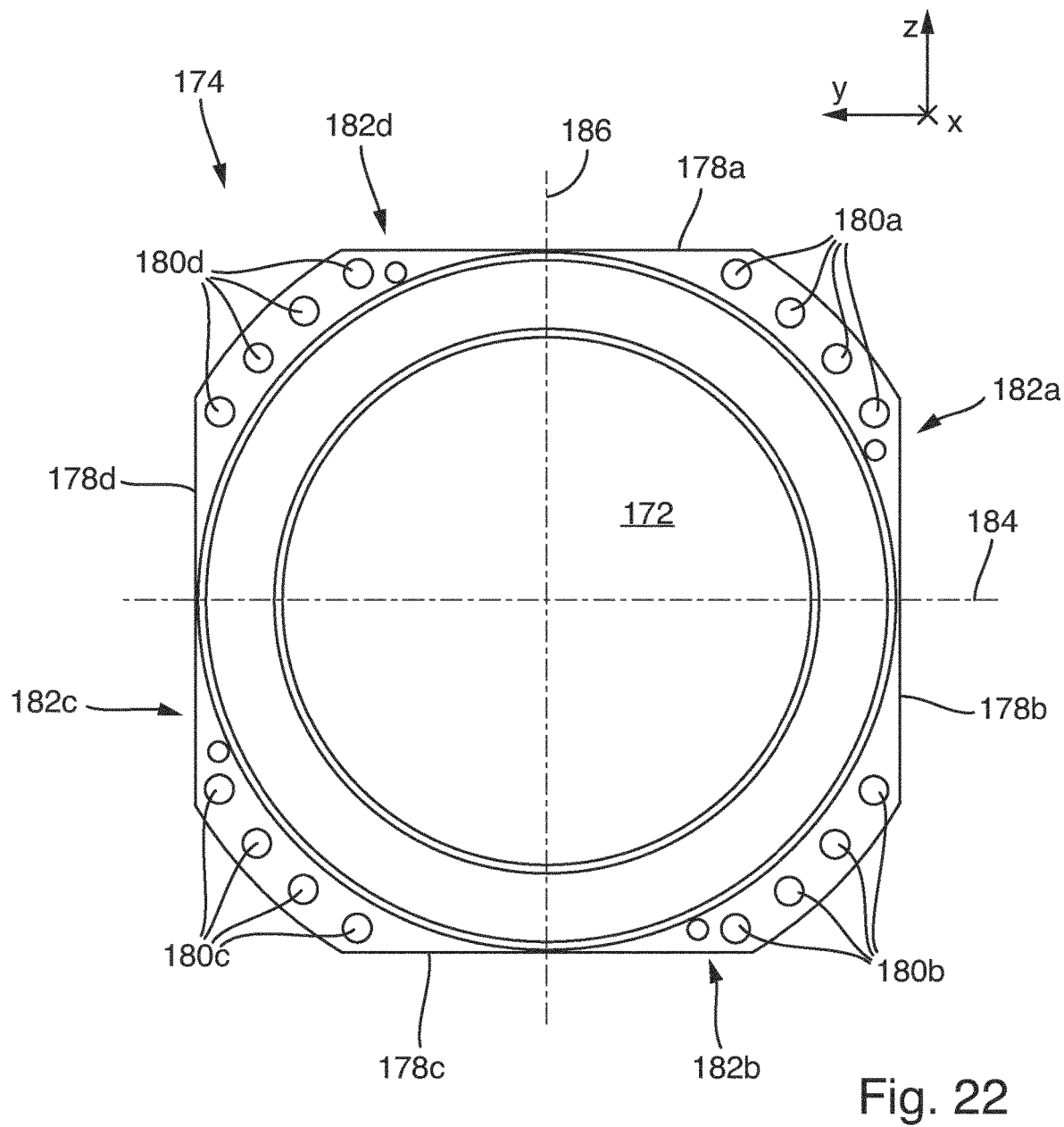
FIG. 22 schematically shows a front view of a motor-unit-side end of the coupling flange depicted in FIGS. 20 and 21.

As can be gathered from FIG. 22, the motor-unit-side end 174 of the coupling flange 170 comprises a plurality of first interface elements 178, 180. Generally, in the context of the present disclosure, the term "interface element" refers to an element configured to structurally interconnect or align two components in a predefined position and orientation to one another. Accordingly, the first interface elements 178, 180 are configured to provide at least one of a form- and force-fitting connection between the motor unit 14 and the coupling flange 170. Further, in the context of the present disclosure, the term "the plurality of first interface elements" refers to all interface elements used or required for properly coupling the motor unit 14 to the coupling flange 170.

Specifically, the plurality of first interface elements 178, 180 comprises a first coupling contour 178 which is designed complementary to a further first coupling contour of a coupling recess provided at the motor unit 14. Accordingly, in each one of the first to fourth mounted states in which the motor unit 14 is coupled to the coupling flange 170, the first coupling contour 178 is accommodated within and therefore engaged with the complementary designed coupling recess, i.e. its further first coupling contour, of the motor unit 14 such that the coupling flange 170 and the motor unit 14 are form-fittingly connected and aligned relative to one another as regards their relative rotational orientation, in particular around the longitudinal axis L.

The plurality of first interface elements 178, 180 further comprises a plurality of first through bores 180 which are configured for receiving connecting screws or bolts, via which the motor unit 14 is to be force-fittingly connected to the coupling flange 170.

Figure 20:
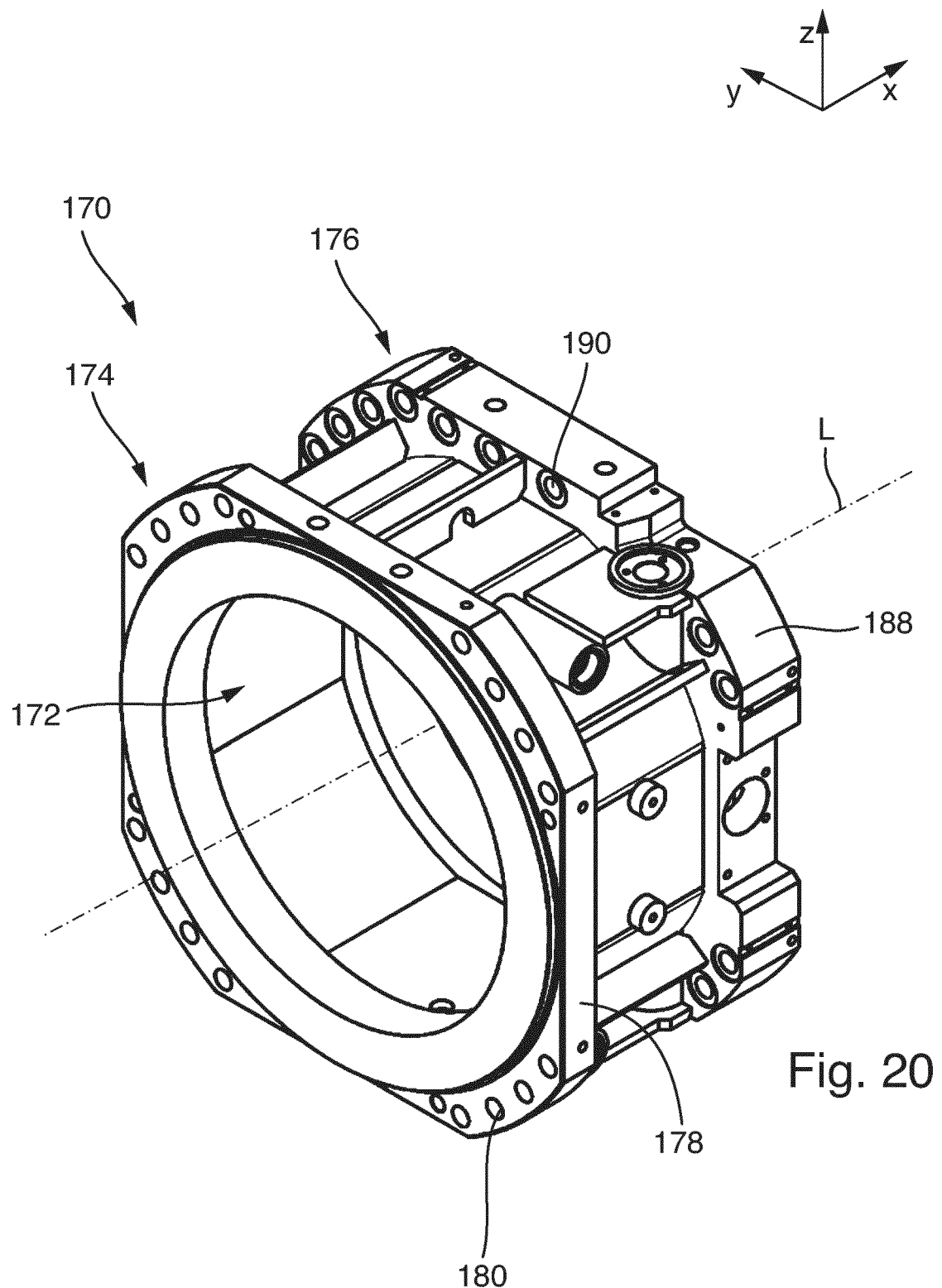
FIGS. 20 and 21 schematically show a perspective view of a coupling flange of a drive unit for structurally coupling a motor unit to a gearbox.

As can be gathered from FIGS. 20 and 22, in a cross-sectional profile of the motor-unit-side end 174, i.e. in a plane that is perpendicular to the longitudinal axis L, the first coupling contour 178 and the first through bores 180 are arranged in a regular pattern. As to substance, the pattern formed by the first coupling contour 178 and the first through bores 180 in the cross-sectional profile can be divided into four congruent parts 182*a-d* which are arranged adjacent to one another around the longitudinal axis L. This means that the four congruent parts 182*a-d* are of the same shape and size, but have a different position and orientation within the profile. The congruent parts 182*a-d* are rotationally offset relative to one another around the longitudinal axis L of the coupling flange 170. Theoretically speaking, each one of the four congruent parts 182*a-d* may be transformed into or congruently positioned on each one of the other congruent parts 182*a-s* by being pivoted or rotated around the longitudinal axis L. The four congruent parts 182*a-d* are divided by means of a first line 184 and a second line 186 arranged perpendicular to one another and perpendicular relative to the longitudinal axis L. More specifically, in the cross-sectional profile of the motor-unit-side end 174, the plurality of first interface elements are arranged rotationally-symmetric around the longitudinal axis of the coupling flange 170.

By such a structural arrangement of the plurality of first interface elements 178, 180, the proposed coupling flange 170 enables that the motor unit 14 can be secured thereto into the four different mounting positions.

In the following, with reference to FIG. 23, the structural configuration of the gearbox-side end 176 is specified.

Figure 23:
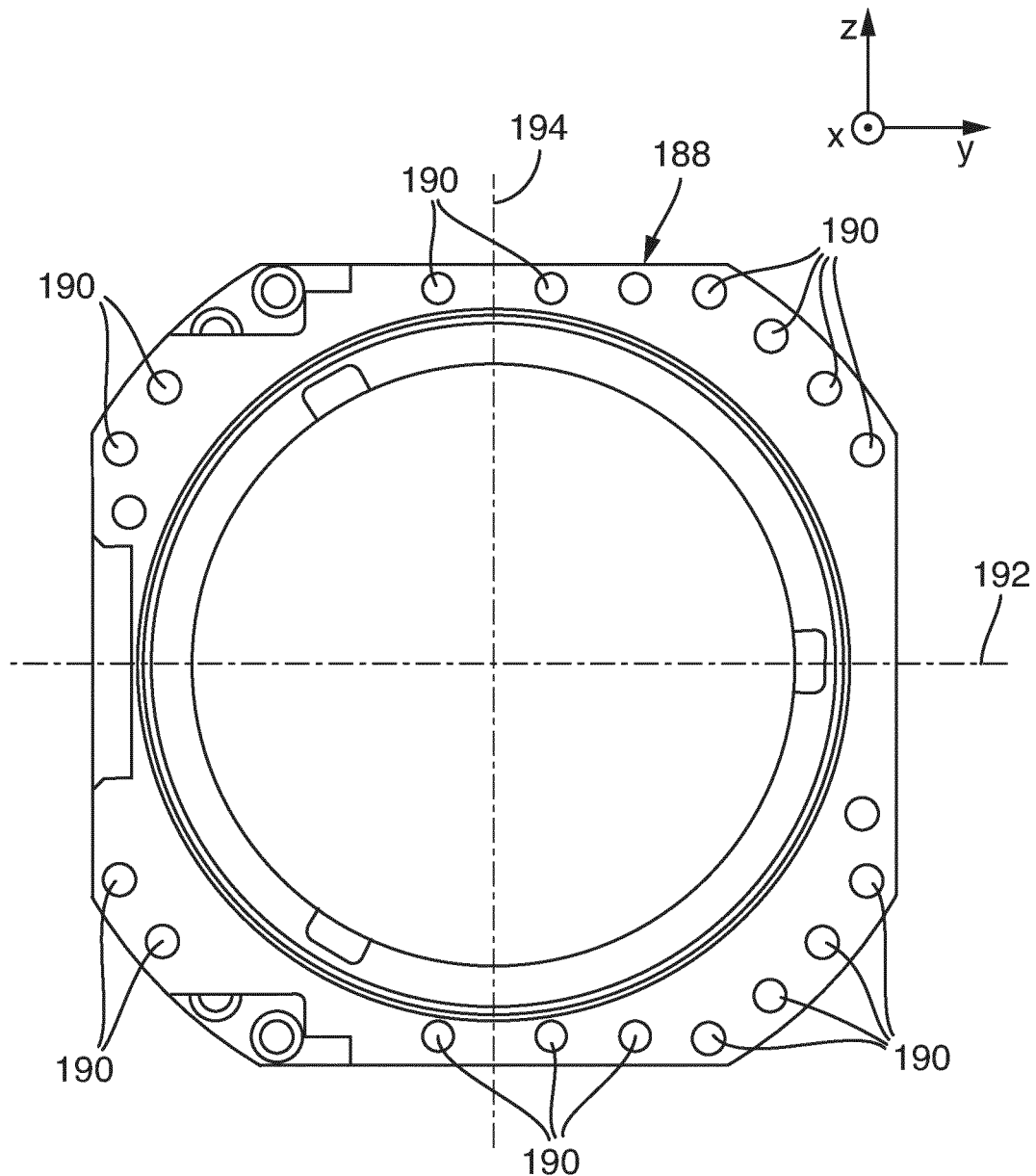
FIG. 23 schematically shows a front view of a gearbox-side end of the coupling flange depicted in FIGS. 20 to 22.

As can be gathered from FIG. 23, the gearbox-side end 176 of the coupling flange 170 comprises a plurality of second interface elements 188, 190. In the context of the present disclosure, the term "the plurality of second interface elements" refers to all interface elements used or required for properly coupling the gearbox 16 to the coupling flange 170. Accordingly, each one of the plurality of second interface elements 188, 190 is configured to provide at least one of a form- and force-fitting connection between the gearbox 16 and the coupling flange 170.

Specifically, the plurality of second interface elements 188, 190 comprises a second coupling contour 188 which is designed complementary to a further second coupling contour of a coupling recess provided at the gearbox 16. Accordingly, in the mounted state in which the gearbox 16 is secured to the coupling flange 170, the second coupling contour 188 is accommodated within and therefore engaged with the complementary designed coupling recess, i.e. its further second coupling contour of the gearbox 16, such that the coupling flange 170 and the motor unit 14 are form-fittingly connected and aligned relative to one another as regards their relative rotational orientation, in particular around the longitudinal axis L.

The plurality of second interface elements 188, 190 further comprises a plurality of second through bores 190 which are configured for receiving connecting screws or bolts, via which the gearbox 16 is to be force-fittingly connected to the coupling flange 170.

Figure 21:
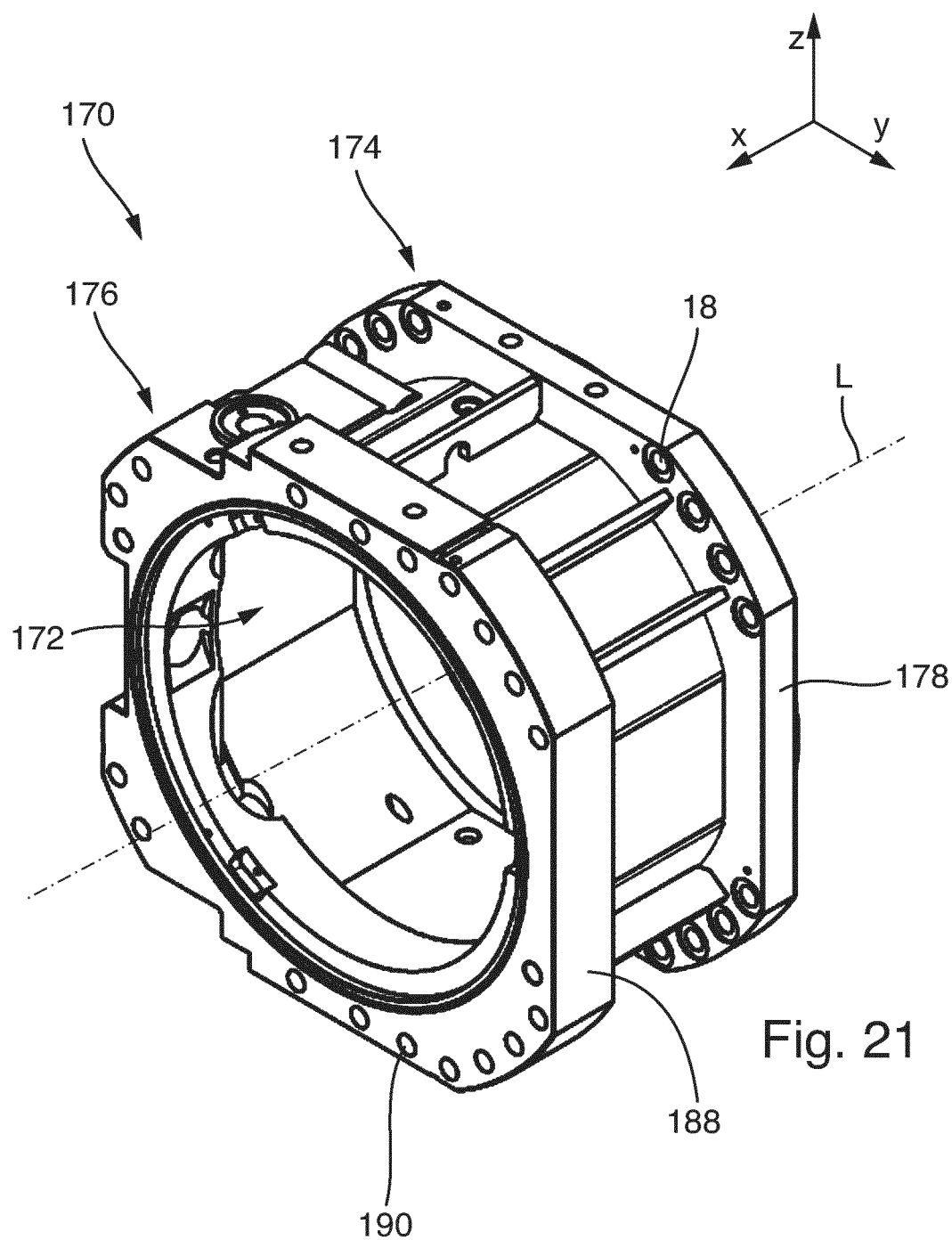

As can be gathered from FIGS. 21 and 23, in a cross-sectional profile of the gearbox-side end 176, i.e. in a plane that is perpendicular to the longitudinal axis L, the plurality of second interface elements 188, 90, i.e. the second coupling contour 188 and the second through bores 190, are arranged non-mirror symmetric in relation to at least one of a further first line 192 being perpendicular to the longitudinal axis L of the coupling flange 170 and a further second line 194 being perpendicular to both the longitudinal axis L of the coupling flange 170 and the further first line 192. The further first line 192 and the further second line 194 intersect at the longitudinal axis L.

By such a structural configuration of the plurality of second interface elements 188, 190, the proposed coupling flange 170 limits the coupling of the gearbox 16 to the coupling flange 170 to a single mounting position, in which the relative orientation between the gearbox 16 of the coupling flange 170 is predefined.

In an alternative configuration, the motor-unit-side end 174 may be configured and used to couple a gearbox to the coupling flange 170 via a complementary designed interface at the gearbox, wherein the gearbox-side end 176 may be configured and used to couple a motor unit to the coupling flange 170 via a complementary designed interface at the motor unit.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is particular the case with respect to the following optional features which may be combined with some or all embodiments, items and/or features mentioned before in any technically feasible combination.

An electric terminal assembly of a drive unit for use in a mining machine may be provided. The electric terminal assembly may comprise a junction box configured to be mounted to the drive unit. Further, the electric terminal assembly may comprise a connecting element for communicatively connecting the junction box to a control device of the drive unit. The electric terminal assembly may be configured to be convertibly arranged into at least two different configurations, each of which is associated to a different structural arrangement of the drive unit.

By being suitable to be convertibly arranged into different configurations, the proposed electric terminal assembly may be adapted to different structural arrangements of the drive unit. In this way, configurability of the electric terminal assembly is provided.

Preferably, the electric terminal assembly is applied to a drive unit which is intended and configured to be used in a mining machine, in particular in an underground mining machine. However, the use of the electric terminal assembly is not limited to this application and, likewise, may be used in connection with other drive units.

The electric terminal assembly may be configured to be releasably or detachably mounted to the drive unit, in particular to an outer surface or a housing thereof.

Further, in the present disclosure, a drive unit to which the proposed electric terminal assembly is mounted is referred to as a drive unit arrangement. Such a drive unit arrangement may be used for driving operating equipment, in particular of the mining machine, such as a conveyer, a cutter or any other electrically driven component thereof.

As set forth above, the proposed electric terminal assembly may be configured to be mounted on the drive unit. The drive unit to be used in connection with the electric terminal assembly may comprise a motor unit accommodating a frequency inverter and an electric motor, e.g. provided in the form of an inverter-fed synchronous machine equipped with permanent magnets. To the motor unit, e.g. to an end surface thereof, a gearbox may be flange-mounted, wherein an output shaft of the motor unit may be arranged in parallel to or orthogonal to the output shaft of the gearbox. Further, a clutch may be interposed between the motor unit and the gearbox.

For controlling operation of the drive unit, the control device may be provided. The control device may be accommodated in a main terminal box of the drive unit, which in particular may be mounted to an outer surface of the drive unit, e.g. the motor unit.

In order to ensure proper operation of the drive unit, the control device may be configured to monitor operating conditions of the drive unit, i.e. of its components during operation. For doing so, at least one sensor is provided which detects or measure parameters being indicative of an operation of the drive unit's components. Specifically, the sensor may be accommodated in or mounted to the gearbox and be configured to measure or detect operating conditions of individual components of the gearbox.

For communicatively connecting the at least one sensor to the control device of the drive unit, the electric terminal assembly may be provided. In other words, the proposed electric terminal assembly may be configured to ensure a proper control and operating condition monitoring function of the drive unit by establishing a communicative connection between components, i.e. electronic components, of the drive unit arrangement.

As set forth above, the electric terminal assembly comprises the junction box. Specifically, the electric terminal assembly may comprise one or more junction boxes. The junction box may comprise or may be connected, i.e. electrically connected, to the at least one sensor configured to acquire data being indicative of an operating condition of the drive unit, in particular of individual components of its gearbox. Further, the junction box may be configured to transmit the data acquired by the at least one sensor to the control device via the connecting element.

Additionally or alternatively, the junction box may comprise a data-collecting device configured to collect or process the data acquired by the sensor before being forwarded to the control device via the connecting element. By such a configuration, the data-collecting device may perform pre-processing of the measurement data, i.e. raw data, provided by the at least one sensor. This may be performed such that the measurement data are bundled and/or consolidated, in particular in a predetermined form, before being forwarded to the control device. In this way, a standardized and efficient communication between the control device and the at least one sensor may be ensured.

The junction box may be configured to communicate with the control device via the connecting element, which in particular may be an electric cable, e.g. a multipole cable. The connecting element may be provided with a first and a second plug connector which are disposed on opposing sides thereof.

The first plug connector of the connecting element may be configured to be detachably mounted to at least one correspondingly designed interface or control port provided on the junction box. For example, the junction box may comprise a first control port and a second control port, each of which is configured to be detachably coupled to the connecting element. The first and the second control port may be provided on opposed sides of the junction box. For example, the first control port may be provided on or in a region of a first side of the junction box and the second control port may be provided on or in a region of a second side being arranged opposed to the first side of the junction box. In this way, the first and the second control port may be provided with a distance to one another so as to improve configurability of the electric terminal assembly.

In a further development, the electric terminal assembly may be configured to be arranged into a first configuration, in which the connecting element is coupled to the first control port, and into a second configuration, in which the connecting element is coupled to the second control port. Further, in the first configuration, the second control port may be unplugged, i.e. may be released from the connecting element or from any other wire or line. Accordingly, in the second configuration, the first control port may be unplugged, i.e. may be released from the connecting element or from any other wire or line.

The second plug connector of the connecting element may be configured to be detachably mounted to at least one correspondingly designed interface or connector provided on the control device side, i.e. the main terminal box side, of the electric terminal assembly so as to communicatively connect the connecting element to the control device. For example, the electric terminal assembly may comprise a connection socket provided on the control device side of the electric terminal assembly to which the junction box is communicatively connected via the connecting element. In other words, the connection socket may be arranged in the region of the control device or the main terminal box accommodating the control device and may form an interface for the connecting element.

Specifically, the connection socket may comprise a first connector and a second connector, each of which is configured to be detachably coupled to the connecting element, in particular to the second plug connector thereof. The first connector may be arranged on or in the region of a first side of the connection socket and the second connector may be arranged on or in the region of a second side of the connection socket being arranged opposed to the first side. The electric terminal assembly may be configured to be arranged into a first configuration, in which the connecting element is coupled to the first connector, and into a second configuration, in which the connecting element is coupled to the second connector of the connection socket. Further, in the first configuration, the second connector may be unplugged, i.e. may be released from the connecting element or from any other wire or line. Accordingly, in the second configuration, the first connector may be unplugged, i.e. may be released from the connecting element or from any other wire or line. The first configuration described in connection with the arrangement of the connection socket may correspond to the first configuration previously described in connection with the arrangement of the junction box or may differ therefrom. Accordingly, the second configuration may correspond to the second configuration previously described in connection with the arrangement of the junction box or may differ therefrom.

In a further development, the junction box may comprise a first sensor port and a second sensor port, each of which is configured to be detachably coupled to a sensor line for receiving at least one of a sensor input or a sensor output. In other words, the sensor line may be configured to supply a sensor input to a sensor accommodated within the junction box. In this case, the sensor line may be a hydraulic feed line enabling that the sensor is fluid-communicatively connected to the drive unit, i.e. the gearbox. In this way, the sensor accommodated in the junction box may be enabled to measure or detect a condition, e.g. a pressure, prevailing in the drive unit, i.e. the gearbox. Alternatively or additionally, the sensor line may be configured to supply a sensor output signal to the junction box, wherein the sensor output signal has been generated by a sensor accommodated outside of the junction box, e.g. in the gearbox. In this case, the sensor line may be an electric cable for electrically connecting the junction box to a sensor so as to transfer data acquired by the sensor to the junction box.

The first and the second sensor port may be provided on opposed sides of the junction box. For example, the first sensor port may be provided on or in a region of a first side of the junction box and the second sensor port may be provided on or in a region of a second side being arranged opposed to the first side of the junction box. In this way, the first and the second sensor port may be provided with a distance to one another.

Specifically, the electric terminal assembly may be configured to be arranged into a first configuration, in which the sensor line is coupled to the first sensor port, and into a second configuration, in which the sensor line is coupled to the second sensor port. Further, in the first configuration, the second sensor port may be unplugged, i.e. may be released from the sensor line or from any other line. Accordingly, in the second configuration, the first sensor port may be unplugged, i.e. may be released from the sensor line or from any other line.

The first configuration described in connection with the arrangement of the sensor ports may correspond to the first configuration previously described in connection with the arrangement of the control ports of the junction box and of the connection socket or may differ therefrom. Accordingly, the second configuration may correspond to the second configuration previously described in connection with the arrangement of the control ports of the junction box and of the connection socket or may differ therefrom.

In a further development, the electric terminal assembly may further comprise a protective cover which, in a state, in which the electric terminal assembly is fastened to the drive unit, is configured to protect or shield, at least partly, the electric terminal assembly. Specifically, the protective cover may be configured to cover exposed wires or lines, i.e. the connecting element and the at least one sensor line, of the electric terminal assembly.

The protective cover may have at least two shielding plates which are configured to be variedly connected to one another, i.e. into different arrangements or configurations. Specifically, the protective cover may be configured to be convertibly arranged into at least two different arrangement or configurations, each of which is associated to a different structural arrangement of a drive unit.

For doing so, the shielding plate may comprise at least one first structural interface and at least one second structural interface, each of which is configured to be detachably fastened to another shielding plate, i.e. an adjacent shielding plate. The electric terminal assembly may be configured to be arranged into a first configuration, in which the first structural interface is fastened to the other shielding plate, and into a second configuration, in which the second structural interface is fastened to the other shielding plate.

Further, in the first configuration, the second structural interface may be released, i.e. not connected to another shielding plate. Accordingly, in the second configuration, the first structural interface may be released, i.e. not connected to another shielding plate.

The first configuration described in connection with the arrangement of the shielding plate may correspond to any one of the previously described first configurations of the electric terminal assembly or may differ therefrom. Accordingly, the second configuration may correspond to any one of the previously described second configurations of the electric terminal assembly or may differ therefrom.

At least one of the plurality of shielding plates may be of a symmetric design, i.e. of an axially symmetric design.

Furthermore, a drive unit arrangement for use in a mining machine may be provided, comprising a drive unit and an electric terminal assembly as described above.

The drive unit used in the drive unit arrangement may be configured to be arranged into at least two different structural arrangements, among which a relative arrangement between a motor unit and a gearbox of the drive unit differs.

A further aspect of the present disclosure refers to a gearbox of a drive unit used in a mining machine, e.g. an underground mining machine, and to a drive unit which is equipped with such a gearbox.

In underground mining applications, drive units, i.e. used for driving operating equipment, such as conveyors, cutters or other driven components, are usually equipped with gearboxes including two planetary gearings, also referred to as two-stage planetary gearboxes, i.e. having a low-speed planetary stage and a high-speed planetary stage. With this configuration, speed and torque conversion form a drive unit's motor shaft to an output shaft of the gearbox is provided. Usually, in the known drive units, a drive shaft of the motor rotates with 1500 rpm at its nominal operating point which, by means of the gearbox, is converted with a gear ratio between 16 to 50.

During operation, the gearboxes are subjected to thermal loads generated, inter alia, by its moving parts. For reducing these loads, it is known to wet the moving parts of the gearboxes with lubricant, thereby reducing friction between the moving parts and improving heat dissipation therefrom. For doing so, the gearboxes are designed such that the moving parts, upon being rotated, at least partly immerse into lubricant, i.e. oil, received in a lubricant sump of the gearbox.

In underground mining applications, a lubricant cooler is provided which comprises a heat exchanger positioned within the lubricant sump for enabling heat dissipation from the lubricant received in the gearbox. In this way, heat may be transferred from the lubricant to a cooling medium flowing through the heat exchanger so as to dissipate heat from the gearbox.

In the known gearboxes used in underground mining machines, the high-speed planetary stage is designed to be guided through the lubricant sump during operation. Due to the high rotational speed of the moving parts of this stage, it may be ensured that the lubricant is adequately distributed within the gearbox and that it is brought in motion within the lubricant sump. In this way, upon circulating within the lubrication sump, the lubricant flows over an outer surface of the heat exchanger, thereby establishing heat transfer by convection between the lubricant and the cooling medium flowing through the heat exchanger.

Due to recent developments, drive units used in mining machines may be equipped with an inverter-fed synchronous motor having permanent magnets. Such motors, however, compared to electric motors commonly used for drive units in mining machines, can be operated at a relatively low motor speed, i.e. of about 300 rpm, at its nominal operating point. Due to the lower motor speed, gearboxes with a reduced gear ratio may be used in such drive units. As a result, it may be sufficient to use only a single-stage planetary gearing in the gearbox. Accordingly, the high-speed planetary stage may be omitted which may lead to a compact and less complex design thereof.

However, by omitting the high-speed planetary stage, the flow or motion of lubricant within the gearbox, in particular the lubricant sump, may be slowed down, thereby affecting heat transfer by convection between the lubricant and the cooling medium.

To take into account the further aspect, it may be an objective to provide an improved gearbox which, in particular, has a compact design and, at the same time, prevents the gearbox from being subjected to excessive thermal loads. Further, it may be an objective to provide a drive unit which is equipped with such a gearbox.

Accordingly, a gearbox of a mining machine drive unit may be provided which comprises a paddle element attached to an actuatable shaft of the gearbox. The paddle element may be configured to set lubricant, e.g. oil, received within a housing of the gearbox in motion upon actuation of the shaft. In other words, upon actuating the shaft of the gearbox, the paddle element may be configured for being guided through the lubricant received within the housing, thereby pushing the lubricant so as to cause movement or circulation of the lubricant within the housing.

By being provided with the paddle element, the proposed gearbox may ensure a sufficient distribution of lubricant among moving parts of the gearbox, even if a nominal speed of the moving parts is reduced compared to know gearboxes. In this way, friction between its moving parts may be reduced, thereby decreasing the amount of heat generated during operation of the gearbox. Further, by being provided with the paddle element, the proposed gearbox may ensure a sufficient movement or circulation of lubricant within its housing, thereby increasing the rate of heat flow dissipated from the lubricant by convection. In this way, effectiveness of heat dissipation from the lubricant may be increased. Accordingly, the suggested solution may prevent the gearbox from being subjected to excessive thermal loads, even if a nominal speed of the moving parts of the gearbox is reduced compared to know gearboxes.

As set forth above, the proposed gearbox is used in a drive unit of a mining machine, e.g. an underground mining machine, such as a longwall mining machine. Such a drive unit is preferably used for driving operating equipment, such as conveyors, cutters or other driven components of the mining machine, but is not limited to this application.

The drive unit to be used in connection with the gearbox may further comprise a motor unit, e.g. accommodating a frequency inverter and an electric motor. Specifically, the electric motor may be provided in the form of an inverter-fed synchronous machine which is equipped with permanent magnets. The electric motor may be provided such that, at its nominal or intended or optimum operating point, it is operated at less than 1400 rpm or 1300 rpm or 1000 rpm, e.g. between 1000 rpm to 200 rpm or between 400 rpm to 200 rpm or between 350 rpm to 250 rpm, in particular about 300 rpm.

The motor unit may comprise a motor shaft acting as a drive shaft thereof. The motor shaft may be connected to an input shaft of the gearbox in a torque-transmitting manner, e.g. directly or via a clutch.

Generally, the gearbox may be configured to provide speed and torque conversion from its actuated input shaft to its output shaft. Specifically, for doing so, the gearbox may be designed to provide a gear ratio between 3 to 15. In other words, the gearbox may be configured to convert the movement of its input shaft such that the output shaft is rotated at a speed that is 3 to 15 times lower than the speed of the input shaft. Accordingly, the gearbox may be configured to convert the torque acting on the input shaft such that a torque acting on the output shaft may be 3 to 15 times greater than that one acting on the input shaft.

As set forth above, the paddle element may be attached to an actuatable shaft of the gearbox, referred to as the "shaft" in the following, which may be a rotatably actuatable shaft. Preferably, the shaft may be the input shaft of the gearbox which, in the described application, may be rotated at a higher speed compared to the output shaft. Alternatively, the shaft may be the output shaft or any other shaft of the gearbox.

Specifically, the gearbox may be a single-stage planetary gearing, also referred to as an epicyclic gear train. In such a configuration, the input shaft of the gearbox may be fastened to a sun gear in a torque-transmitting manner, wherein the output shaft may be connected to planet gears carrier or a ring gear of the planetary gearing in a torque-transmitting manner. By such a configuration, the gearbox may be provided only with a low-speed planetary stage. In other words, a high-speed planetary stage as used in known gearboxes may be omitted, thereby enabling a compact and less complex design of the gearbox.

The gearbox may comprise a housing accommodating the moving parts of the gearbox. The housing may be configured to delimit a lubricant sump or lubricant reservoir for receiving the lubricant, e.g. oil. Specifically, the lubricant sump may be provided such that the shaft of the gearbox is at least partly immersed or positioned into lubricant received in the lubricant sump upon actuation of the shaft.

The gearbox may be provided such that, during operation of the gearbox, i.e. upon actuating the shaft, the paddle element is configured to at least partially immerse into the lubricant received in the lubricant sump. In other words, upon rotating the shaft, the paddle element may be moved such that it is at least partially dipped into and thus is guided through the lubricant received in the lubricant sump, thereby inducing a movement of the lubricant received in the lubricant sump.

The paddle element may be attached to an outer surface, in particular a circumferential surface or a periphery, of the shaft, e.g. in a form- and/or force-fitting manner. For example, the paddle element, along the longitudinal axis of the shaft, may be arranged between two bearings, via which the shaft is rotationally mounted to the housing of the gearbox.

Specifically, the paddle element may comprise at least one blade, also referred to as a paddle. For example, the paddle element may comprise more than one blade which may be regularly positioned onto the circumferential surface of the shaft around its longitudinal axis.

The at least one blade may be provided such that it rises or extends from the outer surface of the shaft along a radial direction of the shaft. Alternatively or additionally, the at least one blade may extend along the longitudinal axis of the shaft. In other words, an effective surface of the at least one blade may extend in a plane spanned by the longitudinal and a radial axis of the shaft. Specifically, the effective surface of the at least one blade may be provided in the form of a trapezoid, in particular in the form of a right or acute trapezoid. Accordingly, the at least one blade may be provided in the form of a prism, a cross-sectional profile of which may be provided in the form of a trapezoid, in particular a right or acute trapezoid.

In a further development, the paddle element may be formed in multiple pieces, which in particular may be releasably fastened to one another, e.g. in a force- and/or formfitting manner. Alternatively, the paddle element may be integrally formed.

For example, the paddle element may be provided in the form of a paddle wheel. The paddle wheel may comprise a ring element, on an outer surface of which a plurality of blades may be provided. In other words, the plates may be set around a periphery of the ring element. The ring element may be positioned or mounted circumferentially around the outer surface, i.e. the periphery, of the shaft.

Further, the ring element of the paddle wheel may be provided with at least one junction for releasably connecting two ends or sections of the ring element to one another. For example, the ring element may be provided with one junction for releasably connecting two ends or sections of the ring element, while on an opposing side of the junction, the ring element may be provided with a joint. In this way, it may be ensured that the ring element can be opened or unfolded so as to facilitate assembly to and/or disassembly from the shaft. Alternatively or additionally to the joint, the ring element, at least partially, may be made of an elastic or flexible material for enabling to unfold the ring element. Alternatively or additionally, the ring element may be provided with two junctions, which may be arranged on opposing sides of the ring element. The junction may be formed by a connecting element, such as a screw or a pin, which is guided through and connected to correspondingly designed openings provided at the two sections or ends of the ring element, respectively.

As set forth above, the ring element may be provided with two junctions arranged on opposing sides thereof. By such a configuration, the paddle element may be built up of two parts which can be mounted together on the shaft even when the shaft is already received in the bearings of the housing. In this way, assembly and disassembly of the paddle element may be facilitated.

In a further development, the suggested gearbox may be provided with at least one lubricant cooler unit. Preferably, the lubricant cooler unit is used in connection with the above-described paddle element, but is not limited thereto. Rather, the lubricant cooler unit described in the following may also be used or implemented in a gearbox without applying the above-described paddle element.

The use of the lubricant cooler unit may particularly be relevant when the gearbox is used in underground mining applications. This is because, in underground mining environments, the ambient temperature may be relatively high and due to dirt accumulated on an outer surface of the mining machine, protection measure, i.e. explosion and dust protection, etc., thermal conductivity may be reduced, thereby decreasing the rate of heat dissipation from the lubricant received in the housing of the gearbox.

The lubricant cooler unit may comprise at least one heat exchanger, through which a cooling medium is guided or circulated. For example, the cooling medium may be water. The heat exchanger may comprise at least one cooling pipe, e.g. a helical cooling pipe, having a supply opening and a discharge opening for the cooling medium. Specifically, the heat exchanger may be configured to transfer heat from the lubricant received in the housing to the cooling medium flowing through the heat exchanger. For doing so, the heat exchanger may be intended and configured to get in contact with the lubricant received in the housing of the gearbox during its operation. Accordingly, the heat exchanger may be positioned within the housing of the gearbox.

Further, the lubricant cooler unit may comprise a spray unit configured to spray lubricant onto the heat exchanger. In this way, it may be ensured that the heat exchanger is wetted or gets in contact with lubricant accommodated within the housing of the gearbox during its operation.

Specifically, the gearbox may be provided such that, in its mounted state, i.e. in which it is installed in a mining machine together with the drive unit, at least one of the heat exchanger and the spray unit is at least partially arranged outside of the lubricant sump.

The spray unit may comprise a spray element, e.g. a spray pipe, for spraying and distributing lubricant among an outer surface of the heat exchanger. Specifically, the spray pipe may extend in parallel to the heat exchanger and may be provided with a plurality of discharge openings for discharging lubricant. The discharge openings may be provided such that they face the heat exchanger. In other words, the spray pipe may be arranged alongside and in the range of the heat exchanger so as to ensure that the heat exchanger is wetted with lubricant, preferably among its entire length.

Further, the spray unit is connected to a pump configured to supply the spray element with lubricant received in the lubricant sump. The pump may be provided so as to be actuated by a rotational movement of the shaft. For doing so, the pump may comprise an idler gear which is designed complementary to and engaged with a pump drive gear arranged circumferentially around the shaft, i.e. around its longitudinal axis.

The pump may be connected a suction piece which, in the operating or mounted state of the gearbox, protrudes or immerses into the lubricant sump. In this way, at least one suction opening may be positioned in the lubricant sump so as to collect lubricant and guide it towards the pump.

In a further development, the suction piece may be configured to be arranged into at least two different positions relative to the housing. In the state, in which the suction element is positioned in a first position, the at least one suction opening may be displaced relative to a state of the suction element, in which it is positioned in a second position. In the two different positions, the suction piece may be oriented into different directions relative to the housing of the gearbox. For example, the suction piece may be provided such that, in the first position, it is oriented in an opposed direction compared to the state, in which it is positioned in the second position. For doing so, the suction piece may be pivotally mounted to the housing. In such a configuration, the suction piece may be pivotable around an axis being substantially perpendicular to the longitudinal axis of the shaft.

In this way, the lubricant cooler unit may be adapted to different mounting conditions of the drive unit, thereby providing a certain degree of configurability. In other words, by being provided with such a lubricant cooler unit, the gearbox may be installed in a mining machine in different mounting positions or installation orientations, i.e. among which different sides of the gearbox may constitute an upper side thereof.

In a further development, the gearbox may comprise at least two lubricant cooler units as described above. This provides a certain degree of redundancy. The at least two lubricant cooler units may be arranged on opposed sides within the housing of the gearbox. In this way, it may be ensured that, even if the gearbox is installed within the mining machine in different mounting positions or installation orientations, a sufficiently large portion of the lubricant cooler units is positioned on the lubricant sump such that a sufficient rate of heat may be transferred from the lubricant to the cooling medium flowing through the different heat exchangers. For example, the two lubricant cooler units may be arranged opposed to one another relative to the longitudinal axis of the shaft. The housing may have a rectangular cross-sectional shape among the longitudinal axis of the shaft, wherein the heat exchangers and the spray elements of the different lubricant cooler units may extend in parallel to and in the range of opposing sides of the housing. By such an arrangement, the gearbox may be installed in the mining machine into different mounting positions or installation orientations which may be displaced relative to one another around the longitudinal axis of the shaft, e.g. about 90°, 180° and 270°, while a sufficient cooling of the lubricant may be ensured for each one of the different positions or orientations. In other words, the gearbox may be installed in different mounting positions or installation orientations, while the configuration of the lubricant cooler units may ensure a sufficient cooling in each one of these mounting positions.

To summarize, each one of the above described measures, namely the provision of the paddle element and the lubricant cooler unit comprising the spray element, may ensure that, also with a relatively low motor speed, e.g. below a nominal speed, a sufficiently high rate of heat flow from the lubricant to the cooling medium flowing through the heat exchanger is provided in the gearbox.

Furthermore, a drive unit of a mining machine, e.g. an underground mining machine, such as a longwall mining machine, may be provided which is equipped with the above described gearbox.

Since the drive unit is equipped with the above described gearbox, technical features which are described in connection with the gearbox in the present disclosure may also relate and be applied to the proposed drive unit, and vice versa.

Specifically, the drive unit may comprise a motor connected to the gearbox, wherein the motor is an inverter-fed synchronous machine, e.g. equipped with permanent magnets, which, in particular, at its nominal or intended or optimum operating point, has a motor speed of less than 1400 rpm or 1300 rpm or 1000 rpm, e.g. between 1000 rpm to 200 rpm or between 400 rpm to 200 rpm or between 350 rpm to 250 rpm, in particular about 300 rpm.

For solving the objective of providing an improved gearbox, one of the following items may be provided:
1. Gearbox (16) of a mining machine drive unit (12), comprising a paddle element (80) attached to an actuatable shaft (72) of the gearbox (16) for setting lubricant received within a housing of the gearbox (16) in motion upon actuation of the shaft (72).
2. Gearbox according to item 1, which is a single-stage planetary gearing.
3. Gearbox according to item 1 or 2, in which the housing of the gearbox (16) delimits a lubricant sump, wherein the paddle element (80) is configured to at least partially immerse into lubricant received in the lubricant sump upon actuation of the shaft (72).
4. Gearbox according to any one of items 1 to 3, wherein the paddle element (80) comprises at least one blade (84), an effective surface of which extends in a plane spanned by a longitudinal axis (78) and a radial axis of the shaft (72).

5. Gearbox according to any one of items 1 to 4, wherein the paddle element (80) is formed in multiple pieces, which are releasably fastened to one another.
6. Gearbox according to any one of items 1 to 5, wherein the paddle element (80) is provided in the form of a paddle wheel comprising a ring element (82) around which a plurality of blades (84) are set.
7. Gearbox according to item 6, wherein the ring element (82) is provided with at least one junction (86) for releasably connecting two sections of the ring element (82) to one another.
8. Gearbox according to any one of items 1 to 7, further comprising a lubricant cooler unit (90; 92) having a heat exchanger (94) and a spray unit (102) configured to spray lubricant onto the heat exchanger (94).
9. Gearbox according to item 8, wherein in a mounted state of the gearbox (16), the heat exchanger (94), at least partly, is arranged outside of the lubricant sump within the housing.
10. Gearbox according to item 8 or 9, wherein the spray unit (102) comprises a spray element (104), which extends in parallel to the heat exchanger (94) and which is provided with a plurality of discharge openings facing the heat exchanger (94).
11. Gearbox according to item 10, wherein the spray unit (102) is connected to a pump (106) configured to supply the spray element (104) with lubricant received in the lubricant sump, wherein the pump (104) is actuated by a rotational movement of the shaft (72).
12. Gearbox according to item 11, wherein the pump (106) is connected to a suction piece (114) which, in a mounted state of the gearbox (16), is arranged to at least partly immerse into lubricant received in the lubricant sump, and wherein the suction piece (114) is configured to be arranged into at least two different positions relative to the housing of the gearbox (16).
13. Gearbox according to any one of items 1 to 12, comprising at least two lubricant cooler units (90; 92) which are arranged within the housing of the gearbox (16) on opposed sides.
14. Drive unit (12) of a mining machine, comprising a gearbox (16) according to any one of items 1 to 13.
15. Drive unit according to item 14, further comprising a motor (18) connected to the gearbox (16), wherein the motor (18) is an inverter-fed synchronous machine which, in particular, at its nominal operating point, has a motor speed of less than 1000 rpm, in particular of about 300 rpm.

A further aspect of the present disclosure refers to a gearbox for use in a mining machine drive unit, in particular to a spatial arrangement of its bearings, and to a drive unit which is equipped with such a gearbox.

In underground mining applications, drive units used for driving operating equipment, such as conveyors, cutters or other driven components, are usually equipped with gearboxes including at least one planetary gear assembly for providing speed and torque conversion from a drive unit's motor shaft to an output shaft of the gearbox.

In the known gearboxes, the planetary gear assembly comprises a plurality of planet gears which are carried by a planet gear carrier and which are guided between a sun gear and a ring gear. Specifically, the planet gears are rotatably supported in the planet gear carrier, wherein the planet gear carrier itself is rotatably supported in the gearbox. Also the sun gear is rotatably supported, wherein the rotational axis of the sun gear and the planet gear carrier coincide. To that end, the ring gear is fixedly mounted to a housing of the gear box.

Specifically, for rotatably supporting the planet gear carrier and the sun gear within the gearbox, a plurality of bearings are provided which are set around a longitudinal axis of the gearbox and which are positioned along the longitudinal axis in a distributed manner.

Due to recent developments, it may be favorable to provide a gearbox for use in a mining machine drive unit having an improved spatial efficiency.

Thus, to take into account the further aspect, it may be an objective to provide a gearbox for use in a mining machine drive unit which has a compact design. Further, it may be an objective to provide a drive unit which is equipped with such a gearbox.

Accordingly, a gearbox may be provided, which is intended for use in a mining machine drive unit, i.e. a drive unit configured for being installed in a mining machine. The gearbox may have a planetary gear assembly comprising a sun gear rotatably supported in the gearbox by means of a first bearing and a planet gear carrier rotatably supported in the gearbox by means of a second bearing. The first and the second bearing may be designed and arranged such that they at least partly overlap in an axial direction of the planetary gear assembly.

With the suggested arrangement of the first and the second bearing, i.e. such that they at least partly overlap in the axial direction, an overall length of the gearbox along the axial direction may be reduced. To that end, with such a configuration, the first and the second bearing may be fitted one within the other which contributes to an improved or optimal space utilization and thus to an improved spatial efficiency of the gear box. Accordingly, a gearbox provided with the proposed arrangement of the first and the second bearing may have a more compact design compared to known gearboxes, in which bearings for supporting the sun gear and the planet gear carrier are arranged spaced apart from one another along the axial direction.

It is noted that the features of the gearbox may be combined with the previously described features in this disclosure. For example, the proposed gearbox described in the following may be provided with a paddle element and/or a lubricant cooling system as disclosed above.

The proposed gearbox may be intended and configured to be used in a drive unit of a mining machine, e.g. an underground mining machine, such as a longwall mining machine. Such a drive unit is preferably used for driving operating equipment, such as conveyors, cutters or other driven components of the mining machine, but may not be limited to this application.

The drive unit to be used in connection with the gearbox may further comprise a motor unit, e.g. accommodating a frequency inverter and an electric motor. Specifically, the electric motor may be provided in the form of an inverter-fed synchronous machine which is equipped with permanent magnets. The motor unit may comprise a motor shaft acting as a drive shaft thereof. The motor shaft may be connected to an input shaft of the gearbox in a torque-transmitting manner, e.g. directly or via a clutch. Generally, the gearbox may be configured to provide speed and torque conversion from its actuated input shaft to its output shaft.

The gearbox may be an in-line planetary gearbox, in which the input shaft and the output shaft are arranged substantially in parallel to one another or coincide. Such a gearbox may be installed or used in a P-arrangement drive unit. Alternatively, the gearbox may be a bevel planetary gearbox, in which the input shaft and the output shaft are arranged substantially perpendicular to one another. Such a gearbox may be installed or used in a KP-arrangement drive unit.

The gearbox may be designed to provide a gear ratio between 3 to 15. For doing so, the gearbox may comprise the planetary gear assembly. The planetary gear assembly may interconnect the input shaft and the output shaft of the gearbox in a torque-transmitting manner.

The basic structural configuration and characteristics of a planetary gear assembly are well known to a person skilled in the art and are therefore not further specified. Rather, characteristics and technical features of the gearbox which are interlinked to the aspects of the present disclosure are addressed in the following.

The planetary gear assembly may comprise a plurality of planet gears, e.g. 3, 4 or more, which are carried by the planet gear carrier and which are guided between and engaged with the sun gear and a ring gear. The planetary gear assembly may be accommodated within a housing of the gearbox.

The ring gear may be fixedly mounted to the housing. The sun gear and the planet gear carrier, as set forth above, are rotatably supported in the gearbox. Further, the planet gears may be rotatably mounted to the planet gear carrier, respectively. In other words, the sun gear, the planet gears and the planet gear carrier may be supported within the gearbox such that they are rotatable relative to the housing of the gearbox. For doing so, the first bearing configured for rotatably supporting the sun gear in the gearbox, i.e. its housing, and the second bearing configured for rotatably supporting the planet gear carrier in the gearbox, i.e. its housing, may be provided.

As set forth above, the first and the second bearing may at least partly overlap in the axial direction of the planetary gear assembly. In other words, when viewed from a radial direction of the planetary gear assembly, i.e. which extends perpendicular to the axial direction, the first and the second bearing may be arranged in succession such that the first bearing at least partly covers the second bearing, or vice versa. For example, the first and the second bearing may overlap in the axial direction along the whole length of the first or the second bearing, i.e. along their extension in the axial direction of the planetary gear assembly.

The axial direction of the planetary gear assembly may coincide with at least one of a longitudinal or rotational axis of the sun gear, a longitudinal or rotational axis of the planet gear carrier, a longitudinal axis of the gearbox, a longitudinal axis of the input shaft and a longitudinal axis of the output shaft.

Further, the first and the second bearing may be arranged coaxially. In other words, a longitudinal or rotational axis of the first bearing may coincide with a longitudinal or rotational axis of the second bearing. The first bearing may at least partly encapsulate the second bearing, or vice versa. In this way, a compact structural arrangement of the first and the second bearing within the gearbox may be provided.

At least one of the first and the second bearing may be a roller bearing. For example, both the first and the second bearing may be provided in the form of a roller bearing. Generally, such bearings may comprise an inner and an outer ring raceway delimiting a guiding groove for accommodating and guiding rolling elements, e.g. in the form of ball or cylinder elements. The load acting upon the loading elements of a roller bearing in a mounted state, i.e. during operation, may be specified by the effective force line which, as set forth above, indicates a direction of a cumulative load acting upon the rolling element of the roller bearing.

In the proposed gearbox, the first and the second bearing may be provided such that the effective force lines of the first bearing indicating a direction of loading acting upon its rolling elements may be substantially parallel to the effective force lines of the second bearing indicating a direction of loading acting upon its rolling elements. Alternatively, the first and the second bearing may be provided such that the effective force lines of both the first and the second bearing are arranged in a plane, i.e. a common plane. Specifically, the plane may be arranged substantially perpendicular to the axial direction.

Specifically, at least one of the first and the second bearing may be a radial ball bearing, a spherical roller bearing and a cylindrical roller bearing, in particular a NJ design cylindrical roller bearing. For example, in one configuration, the first bearing may be a radial ball bearing or a spherical roller bearing, wherein the second bearing may be a cylindrical roller bearing, in particular a NJ design cylindrical roller bearing.

The first bearing may be directly attached to the sun gear of the planetary gear assembly. Specifically, the first bearing, i.e. its inner ring raceway, may be positioned onto a circumferential outer surface of the sun gear, i.e. a shaft thereof. Alternatively, the first bearing may be attached to a holding component of the gearbox which holds the sun gear, i.e. to which the sun gear is fixedly mounted. In such a configuration, the sun gear may be rotatably supported within the gearbox via or by means of the holding component. Accordingly, the first bearing may be directly attached to the holding component, e.g. to a circumferential outer surface thereof. For example, the holding element may be an actuatable shaft of the gearbox which may be connected to the drive shaft of the drive unit's motor unit in a torque-transmitting manner. More specifically, the actuatable shaft may constitute the input shaft of the gearbox. Alternatively, the actuatable shaft may constitute an intermediate shaft of the gearbox which interconnects the sun gear and the input shaft of the gearbox in a torque-transmitting manner.

Accordingly, the sun gear may be fastened, e.g. firmly mounted, to the actuatable shaft, in particular in a form- and/or force-fitting manner. Preferably, the sun gear is connected to the actuatable shaft such that the longitudinal or rotational axis of the sun gear coincides with a longitudinal or rotational axis of the actuatable shaft. The first bearing may be attached to the actuatable shaft, e.g. to an outer surface thereof. In this way, the actuatable shaft together with the sun gear fastened thereto may be rotatably supported in the gearbox.

For rotatably supporting the sun gear and optionally the actuatable shaft in the gearbox, at least one further first bearing may be provided. The at least one further first bearing may be provided in the form of at least one of a radial ball bearing and a NU design cylindrical bearing. The first bearing and the further first bearing may constitute a floating bearing for rotatably supporting the sun gear and optionally the actuatable shaft in the gearbox.

In a further development, the planet gear carrier may be rotatably supported in the gearbox by means of at least one further second bearing. The further second bearing may be provided in the form of a tapered roller bearing, in particular a double row tapered roller bearing. The second bearing and the further second bearing may be arranged on opposed sides relative to the planet gears of the planetary gear assembly. In particular, the second and the further second bearing may be arranged on opposed sides relative to the planet gears along the axial direction of the planet gear assembly.

Alternatively or additionally, the planet gear carrier may be provided with a support element, in particular a hollow cylindrically-shaped support element, to which at least one of the first or the second bearing is mounted, in particular directly mounted. The first bearing may be mounted to an inner surface, in particular a circumferential inner surface, or to an outer surface, in particular a circumferential outer surface, of the support element. Further, the second bearing may be mounted to the inner surface or the outer surface of the support element. For example, the first bearing may be mounted to the inner surface of the support element, wherein the second bearing may be mounted to the outer surface of the support element. Alternatively, the second bearing may be mounted to the inner surface of the support element, wherein the first bearing may be mounted to the outer surface of the support element.

According to one configuration, the first bearing may be interposed between the sun gear or the actuatable shaft and the planet gear carrier. Specifically, the first bearing may be fastened, in particular directly fastened, to the sun gear or the actuatable shaft, in particular to an outer surface thereof, and to the planet gear carrier. Further, the second bearing may be interposed between the planet gear carrier and the housing of the gearbox. Specifically, the second bearing may be fastened, in particular directly fastened, to the planet gear carrier, in particular to an outer surface thereof, and to the housing of the gearbox, in particular to an inner surface thereof. In this configuration, the first bearing may be mounted to the inner surface of the support element and the second bearing may be mounted to the outer surface of the support element.

In a further development, the sun gear or the actuatable shaft may be provided with a hollow cylindrically-shaped further support element to which at least one of the first and the second bearing is mounted, particularly directly mounted. The first bearing may be mounted to an inner surface, in particular a circumferential inner surface, or to an outer surface, in particular a circumferential outer surface, of the further support element. Further, the second bearing may be mounted to the inner surface or the outer surface of the further support element. For example, the first bearing may be mounted to the inner surface of the further support element, wherein the second bearing may be mounted to the outer surface of the further support element. Alternatively, the second bearing may be mounted to the inner surface of the further support element, wherein the first bearing may be mounted to the outer surface of the further support element.

According to a further configuration, the first bearing may be interposed between the further support element and the housing of the gearbox. Specifically, the first bearing may be fastened, particularly directly fastened, to the further support element, in particular to an outer surface thereof, and to the housing, in particular to an inner surface thereof. Further, the second bearing may be interposed between the further support element and the planet gear carrier, in particular its support element. Specifically, the second bearing may be fastened, in particular directly fastened, to the further support element, in particular to an inner surface thereof, and to the planetary gear carrier, in particular to an outer surface of its support element. In this configuration, the first bearing may be mounted to an outer surface of the further support element, wherein the second bearing may be mounted to an inner surface of the further support element.

Furthermore, a drive unit of a mining machine may be provided which comprises a gearbox as described above. Accordingly, the technical features described in connection with the gearbox may also relate and be applied to the drive unit.

For solving the objective of providing an improved gearbox, one of the following items may be provided:

1. Gearbox (16) for use in a mining machine drive unit (12), having a planetary gear assembly (122) comprising a sun gear (128) rotatably supported in the gearbox (16) by means of a first bearing (74) and a planet gear carrier (126) rotatably supported in the gearbox (16) by means of a second bearing (140), wherein the first and the second bearing (74, 140) at least partly overlap in an axial direction (A) of the planetary gear assembly (122).
2. Gearbox according to item 1, wherein the gearbox (16) is an in-line planetary gearbox, in which an input shaft (72) and an output shaft (22) of the gearbox (16) are arranged in parallel to one another, or is a bevel planetary gearbox, in which the input shaft (16) and the output shaft (22) of the gearbox (16) are arranged perpendicular to one another.
3. Gearbox according to item 1 or 2, wherein the first and the second bearing (74, 140) are arranged coaxially.
4. Gearbox according to any one of items 1 to 3, wherein the first and the second bearing (74, 140) are roller bearings, and wherein effective force lines of the first and the second bearing (74, 140) indicating a direction of loading acting upon their rolling elements are arranged in a plane (P), which in particular is perpendicular to the axial direction (A).
5. Gearbox according to any one of items 1 to 4, wherein the first bearing (74) is a radial ball bearing or a spherical roller bearing, and wherein the second bearing (140) is a cylindrical roller bearing.
6. Gearbox according to any one of items 1 to 5, wherein the sun gear (128) is fastened to an actuatable shaft (72; 154) of the gearbox (16), and wherein the first bearing (74) is attached to an outer surface of the actuatable shaft (72; 154).
7. Gearbox according to any one of items 1 to 6, wherein the sun gear (128) is rotatably supported in the gearbox (16) by means of at least one further first bearing (76; 156, 158) provided in the form of a radial ball bearing (76; 158) or a cylindrical roller bearing (156).
8. Gearbox according to any one of items 1 to 7, wherein the planet gear carrier (126) is rotatably supported in the gearbox (16) by means of a further second bearing (142), in particular in the form of a double row tapered roller bearing, and wherein the second and the further second bearing (140, 142) are arranged on opposed sides relative to planet gears (124) of the planetary gear assembly (122).
9. Gearbox according to any one of items 1 to 8, wherein the planet gear carrier (126) is provided with a hollow cylindrically-shaped support element (152) to which at least one of the first and the second bearing (74, 140) is mounted.
10. Gearbox according to any one of items 1 to 9, wherein the first bearing (74) is interposed between the planet gear carrier (126) and the sun gear (128), and wherein the second bearing (140) is interposed between the planet gear carrier (126) and a housing (132) of the gearbox (16).
11. Gearbox according to items 9 and 10, wherein the first bearing (74) is mounted to an inner surface of the support element (152) and the second bearing (140) is mounted to an outer surface of the support element (152).
12. Gearbox according to any one of items 1 to 11, wherein the sun gear or the actuatable shaft (154) is provided with a hollow cylindrically-shaped further support element (170) to which at least one of the first and the second bearing (74, 140) is mounted.
13. Gearbox according to item 12, wherein the first bearing (74) is interposed between the further support element (170) and the housing (132) of the gearbox (16), and wherein the second bearing (140) is interposed between the further support element (170) and the planet gear carrier (126).
14. Gearbox according to item 12 or 13, wherein the first bearing (74) is mounted to an outer surface of the further support element (170) and the second bearing (140) is mounted to an inner surface of the further support element (170).
15. Drive unit (12) of a mining machine, comprising a gearbox (16) according to any one of items 1 to 13.

A further aspect of the present disclosure refers to a coupling flange for use in a drive unit of a mining machine for structurally coupling a motor unit to a gearbox, and to a drive unit which is equipped with such a coupling flange.

As set forth above, mining machines, in particular longwall mining machines, are equipped with a plurality of drive units for actuating or driving operating equipment, such as conveyors, cutters or other driven, i.e. traction chain driven components. Usually, drive units employed in mining machines may be provided with a modular design for increasing their reusability and standardization among and within such mining machines. This modular design of the drive unit may comprise a high-performance motor unit, i.e. an electric motor, to which a gearbox is coupled. The gearbox is used for introducing high drive power of the electric motor into drive shafts, e.g. of a chain wheel, of the driven equipment.

In underground mining, it is known to use so-called Controlled Start Transmission (CST) drive systems having a modular design which can be adapted to different mounting conditions, thereby providing a certain degree of configurability. For example, the known CST drive systems allow for arranging the electric motor and the gearbox into different spatial arrangements, in particular with a rotational offset, relative to one another.

Typically, such drive units are built up from components produced by different manufacturer. In this way, it is enabled that gearboxes designed for underground mining applications, which need to meet specific requirements, may be combined with different, particularly commonly used, motor units. Accordingly, it is common practice that motor units and gearboxes are supplied by different manufacturers which are then assembled to a drive unit on a mining machine producer site.

However, by being produced by different manufacturers, it may be time- and cost-consuming to provide a proper coupling between these components, i.e. for allowing that the motor unit and the gearbox may be arranged into different angular positions relative to one another.

To further take into account this aspect, it may be an objective to provide an improved structural coupling between a motor unit and a gearbox within a drive unit, which in particular contributes to an increased configurability of the drive unit. Further, it may be an objective to provide a drive unit in which such a structural coupling is employed.

Accordingly, a coupling flange of a drive unit, particularly for use in a mining machine, may be provided which is configured for structurally coupling a motor unit to a gearbox in at least two different spatial arrangements relative to one another. The coupling flange may be designed and configured such that, among the different spatial arrangements, the motor unit and the gearbox are arranged rotationally offset relative to one another. In other words, by means of the coupling flange, the motor unit and the gearbox may be structurally coupled to one another such that an angular position or orientation between these two components differs among the different spatial arrangements. For example, the coupling flange may be designed and configured such that, in a first assembled state in which the motor unit and the gearbox are coupled to the coupling flange in a first spatial arrangement, the motor unit and the gearbox are arranged rotationally offset relative to one another in relation or compared to a second assembled state in which the motor unit and the gearbox are coupled to the coupling flange in a second spatial arrangement.

The proposed solution provides a coupling flange which constitutes an adapter enabling that the motor unit and the gearbox may be properly coupled within the drive unit. To that end, the coupling flange allows that the motor unit and the gearbox may be positioned into different spatial arrangements, i.e. into different angular orientations relative to one another, thereby providing for an increased degree of the drive unit's configurability. In this way, when being employed in a drive system, the proposed solution may contribute to meet CST system requirements.

It is noted that the suggested coupling flange may be combined with the previously described gearboxes, motor units and drive units. Therefore, technical features described in combination with the previously described gearboxes, motor units and drive units may also relate and be applied to the coupling flange.

The proposed coupling flange may be intended and configured to be used in the drive unit of a mining machine, e.g. an underground mining machine, such as a longwall mining machine. Such a drive unit is preferably used for driving operating equipment, such as conveyors, cutters or other driven components of the mining machine, but may not be limited to this application.

Such a drive unit may further comprise at least one of the motor unit and the gearbox. The motor unit may comprise a frequency inverter and an electric motor. Specifically, the electric motor may be provided in the form of an inverter-fed synchronous machine which is equipped with permanent magnets. The motor unit may comprise a motor shaft which may be connected to an input shaft of the gearbox in a torque-transmitting manner, e.g. directly or via a clutch. In this way, an actuating torque generated by the motor unit may be introduced into the gearbox. The gearbox may be configured to provide speed and torque conversion from its actuated input shaft to its output shaft. For doing so, the gearbox may be a planetary gearing which may comprise at least one planetary gear assembly. Further, the drive unit may comprise a clutch which may be interposed between the motor unit and the gearbox. In the context of the present disclosure, the gearbox or the motor unit may refer to an assembly encompassing the clutch.

The basic structural configuration and characteristics of the motor unit and the gearbox are well known to a person skilled in the art and are therefore not further specified. Rather, characteristics and technical features of the coupling flange which are interlinked to the aspects of the present disclosure are addressed in the following.

The proposed coupling flange may constitute a separate component of the drive unit, i.e. a component that is not integrally formed at the gearbox, the motor unit or at any other component of the drive unit. As a result, the coupling flange may be easily and cost-efficiently provided. This enables that, in practice, the coupling flange may be designed and manufactured for a specific configuration of the drive unit, in particular with regard to its motor unit or gearbox. In other words, the proposed coupling flange, which constitutes an adapter for coupling the motor unit to the gearbox within the drive unit, may be designed component-specifically. This means that the coupling flange may be associated to at least one of a specific motor unit or specific gearbox. Accordingly, the coupling flange may be associated to a specific combination of a gearbox and a motor unit.

The coupling flange may be configured to be interchangeably employed within the drive unit. In this way, when a gearbox or motor unit is exchanged or replaced within the drive unit, also the coupling flange may be exchanged for ensuring proper coupling between the components.

Alternatively or additionally, the coupling flange may be configured to be adapted to different components of the drive unit, particularly to different motor units or gearboxes. For doing so, the coupling flange may comprise interchangeable coupling components associated to different gearboxes or different motor units. Such coupling components may be interchangeably attached to the coupling flange, thereby providing a modular design thereof. Such a component, for example, may be an interface structure of the coupling flange having a predefined first coupling designed complementary to and releasably engageable with a base structure of the coupling flange and a predefined second coupling designed complementary to and releasably engageable with a structural interface provided at the gearbox or the motor unit.

Alternatively or additionally, the coupling flange may be configured such that it may be connectable to different types of gearboxes or motor units. For doing so, the coupling flange may be provided with different types of interface elements associated to different gearboxes or motor units. For example, the coupling flange may comprise a first set of interface elements which are associated and thus configured to be connected to a first type of a gearbox or motor unit and a second set of interface elements which are associated and thus configured to be connected to a second type of a gearbox or motor unit. In this configuration, the interface elements comprised in the first set may at least partly differ from those comprised in the second set.

As set forth above, the motor unit and the gearbox are connected to one another in a torque-transmitting manner such that an actuation torque exerted to a motor shaft of the motor unit may be introduced into the gearbox, particularly via an input shaft of the gearbox. For doing so, the motor unit and the gearbox may be interconnected by a drive shaft. The drive shaft may be rotatably supported in the drive unit such that it is rotatable relative to the gearbox, i.e. a housing thereof, the motor unit, i.e. a housing thereof, and the coupling flange. Specifically, the drive shaft may be formed by at least one of the input shaft of the gearbox and the motor shaft of the motor unit. Alternatively, the drive shaft may constitute an intermediate shaft interconnecting the input shaft of the gearbox and the motor shaft of the motor unit in a torque-transmitting manner.

For interconnecting the motor unit and the gearbox, the coupling flange may be configured such that, in an assembled state of the drive unit, in which the motor unit and the gearbox are secured to the coupling flange, the coupling flange may be interposed between the motor unit and the gearbox. In such a configuration, the coupling flange may be configured to accommodate or encapsulate the drive shaft interconnecting the gearbox, particularly its input shaft, and the motor unit, particularly its motor shaft, in a torque-transmitting manner. For doing so, the coupling flange may be provided with a through opening or passage opening. The through opening may be configured such that, in the assembled state of the drive unit, the drive shaft, at least partly, is accommodated therein or extends therethrough.

More specifically, the through opening may extend through the coupling flange along a longitudinal axis of the coupling flange. In the assembled state of the drive unit, the longitudinal axis of the coupling flange may be arranged in parallel to or may coincide with a longitudinal axis of at least one of the motor unit and the gearbox. Specifically, in the assembled state of the drive unit, the longitudinal axis of the coupling flange may be arranged in parallel to or may coincide with a longitudinal or rotational axis of the drive shaft. Accordingly, in the assembled state of the drive unit, the longitudinal axis of the coupling flange may be arranged in parallel to or may coincide with at least one of a longitudinal or rotational axis of the input shaft of the gearbox and a longitudinal or rotational axis of the motor shaft of the motor unit.

In a further development, the coupling flange may be configured such that, among the different spatial arrangements, the longitudinal axis of the coupling flange may coincide with the longitudinal or rotational axis of the drive shaft. In other words, in each one of the different spatial arrangements of the gearbox and the motor box, the longitudinal axis of the coupling flange may coincide with the longitudinal or rotational axis of drive shaft.

Further, the coupling flange may be configured such that, in the above-described first assembled state in which the motor unit and the gearbox are coupled to the coupling flange in the first spatial arrangement, the gearbox is rotated or pivoted relative to the motor unit around the longitudinal axis of the coupling flange in relation to or compared to the second assembled state in which the motor unit and the gearbox are coupled to the coupling flange in the second spatial arrangement.

Specifically, the coupling flange may be configured such that, in the first assembled state, the motor unit is rotated relative to the gearbox about a certain degree, particularly between 10 to 180°, around the longitudinal axis of the coupling flange in relation to the second assembled state. For example, in the first assembled state, the gearbox may be rotated relative to the motor unit about substantially 90° or 180° around the longitudinal axis of the coupling flange in relation to the second assembled state. Alternatively, the coupling flange may be configured such that, in the first assembled state, the gearbox is rotated relative to the motor unit about substantially 30° or 45° or 60° or 120° or 135° or 150° around the longitudinal axis in relation to the second assembled state.

The coupling flange may be configured for structurally coupling the motor unit and the gearbox to one another into more than two different spatial arrangements relative to one another. In such a configuration, the coupling flange may be configured such that, when the motor unit and the gearbox are arranged in any one of the different spatial arrangements, the gearbox is rotated relative to the motor unit about a certain predefined degree, e.g. about 90°, around the longitudinal axis in relation to at least one of the other spatial arrangements. For example, the coupling flange may be configured for structurally coupling the gearbox and the motor unit to one another into four different spatial arrangements relative to one another. In this configuration, the coupling flange may be configured such that, when the motor unit and the gearbox are coupled to the coupling flange in a first spatial arrangement, the motor unit and the gearbox may be rotated relative to one another about a certain degree, e.g. about 90° or less than 90°, around the longitudinal axis in relation to a second spatial arrangement thereof. Further, when the motor unit and the gearbox are coupled to the coupling flange in the second spatial arrangement, the motor unit and the gearbox may be rotated relative to one another about the certain degree around the longitudinal axis in relation to both the first and a third spatial arrangement. Further, when the gearbox and the motor unit are coupled to the coupling flange in the third spatial arrangement, the motor unit and the gearbox may be rotated relative to one another about the certain degree around the longitudinal axis in relation to both the second and a fourth spatial arrangement. Accordingly, in case the certain degree is 90°, when the motor unit and the gearbox are coupled to the coupling flange in the fourth spatial arrangement, the motor unit and the gearbox may be rotated relative to one another about the certain degree around the longitudinal axis in relation to both the third and the first spatial arrangement.

Specifically, the coupling flange may be configured to hold the motor unit in at least two different mounting positions. In other words, the motor unit may be structurally coupled or firmly fixed to the coupling flange in the at least two different mounting positions, particularly in which a rotational movement of the motor unit relative to the coupling flange is prevented. Specifically, the coupling flange may be configured such that, among the different mounting positions, the motor unit is arranged rotationally offset relative to the coupling flange. In other words, when comparing two different assembled states of the drive unit, among which the mounted position of the motor unit relative to the coupling flange differs, the motor unit is rotationally displaced or rotationally offset relative to the coupling flange. Specifically, the coupling flange may be configured such that, in a first mounted state in which the motor unit is coupled to the coupling flange in a first mounting position, the motor unit may be arranged rotationally offset relative to the coupling flange in relation to or compared to a second mounted state in which the motor unit is coupled to the coupling flange in a second mounting position.

More specifically, the coupling flange may be configured such that, in the first mounted state, the motor unit is rotated relative to the coupling flange around the longitudinal axis in relation to the second mounted state. For example, the coupling flange may be configured such that, in the first mounted state, the motor unit is rotated relative to the coupling flange about a certain degree, e.g. about 90° or 180°, around the longitudinal axis in relation to the second mounted state. Alternatively, the coupling flange may be configured such that, in the first mounted state, the motor unit is rotated relative to the coupling flange about substantially 30° or 45° or 60° or 120° or 135° or 150° around the longitudinal axis in relation to the second mounted state.

In a further development, the coupling flange may be configured to limit the coupling of the motor unit to the coupling flange to the at least two different mounting positions, in each of which a relative orientation between the motor unit and the coupling flange is predefined. In this configuration, the two different mounting positions may constitute predefined positions for coupling the motor unit to the coupling flange. In other words, by such a configuration, it is prevented that the motor unit can be coupled to the coupling flange in any other than the predefined at least two different mounting positions, e.g. four different mounting positions.

Further, the coupling flange may be configured to hold the gearbox in a predefined mounting position. Specifically, the coupling flange may be configured to limit the coupling of the gearbox to the coupling flange to a single mounting position, in which a relative rotation between the gearbox and the coupling flange is predefined. In other words, the gearbox may be structurally coupled or firmly fixed to the coupling flange in only one single mounting position, particularly in which a rotational movement of the gearbox relative to the coupling flange is prevented. By such a configuration, it is prevented that the gearbox can be coupled to the coupling flange in any other than the predefined single mounting position.

Alternatively, the coupling flange may be configured to hold the gearbox in at least two different mounting positions. In other words, the gearbox may be structurally coupled or firmly fixed to the coupling flange in the at least two different mounting positions, particularly in which a rotational movement of the gearbox relative to the coupling flange is prevented. Specifically, the coupling flange may be configured such that, among the different mounting positions, the gearbox is arranged rotationally offset relative to the coupling flange. In other words, when comparing two different assembled states of the drive unit, among which the mounted position of the gearbox relative to the coupling flange differs, the gearbox is rotationally displaced or rotationally offset relative to the coupling flange. Specifically, the coupling flange may be configured such that, in the first mounted state, in which the gearbox is coupled to the coupling flange in a first mounting position, the gearbox may be arranged rotationally offset relative to the coupling flange in relation to or compared to a second mounted state, in which the gearbox is coupled to the coupling flange in a second mounting position. More specifically, the coupling flange may be configured such that, in the first mounted state, the gearbox is rotated relative to the coupling flange around the longitudinal axis in relation to the second mounted state. For example, the coupling flange may be configured such that, in the first mounted state, the gearbox is rotated relative to the coupling flange about a certain degree, e.g. about 90° or 180°, around the longitudinal axis in relation to the second mounted state. Alternatively, the coupling flange may be configured such that, in the first mounted state, the gearbox is rotated relative to the coupling flange about substantially 30° or 45° or 60° or 120° or 135° or 150° around the longitudinal axis in relation to the second mounted state. In a further development, the coupling flange may be configured to limit the coupling of the gearbox to the coupling flange to the at least two different mounting positions, in each of which a relative orientation between the gearbox and the coupling flange is predefined. In this configuration, the two different mounting positions may constitute predefined positions for coupling the gearbox to the coupling flange. In other words, by such a configuration, it is prevented that the gearbox can be coupled to the coupling flange in any other than the predefined at least two different mounting positions.

In case, the coupling flange is configured to limit the coupling of both the motor unit and the gearbox to the coupling flange to a single mounting position, the coupling flange may be configured to adjust a relative rotation orientation between the motor unit and the gearbox. For doing so, the coupling flange may, for example, be provided with a first gearbox-side interface for structurally coupling the gearbox to the coupling flange and with a motor-unit-side interface for structurally coupling the motor unit to the coupling flange, wherein the gearbox-side interface and the motor-unit-side interface may be rotational offset, in particular around the longitudinal axis, relative to one another so as to enable that the motor unit and the gearbox can be coupled to the coupling flange in a predefined spatial arrangement.

The coupling flange may comprise a motor-unit-side end, via which the motor unit may be coupled to the coupling flange. Specifically, the motor-unit-side end may constitute a motor-unit-side interface. In a state in which the motor unit is coupled to the coupling flange, the motor-unit-side end or interface may be engaged with or abut on the motor unit, particularly a complementary designed interface thereof. Further, the motor-unit-side end may comprise a plurality of first interface elements for structurally coupling the motor unit the coupling flange. The first interface elements may be at least one of a connecting element, such as a connecting bolt or screw, and a through bore or through hole for receiving and engaging with a connecting element. Further, the interface element may comprise a contour of the motor-unit-side end which may be configured to be engaged with a complementary designed recess provided at the motor unit, thereby form-fittingly connecting the coupling flange to the motor unit, particularly so as to align the motor unit relative to the coupling flange.

As set forth above, the coupling flange may be configured to hold the motor unit into at least two different mounting positions. For doing so, the plurality of first interface elements may be provided to enable that the motor unit can be coupled to the coupling flange into the at least two different mounting positions. For doing so, the plurality of first interface elements, in a cross-sectional profile, may form a regular pattern of interface elements. This regular pattern may be divided into or comprise a number of congruent parts, e.g. having at least two different first interface elements. The number of congruent parts may correspond to the number of different mounting positions of the motor unit at the coupling flange. The congruent parts may be rotationally offset relative to one another around the longitudinal axis of the coupling flange. Further, the congruent parts may be divided by at least two lines which are perpendicular to and which intersect at the longitudinal axis of the coupling flange. The two lines may be regularly arranged around the longitudinal axis.

Alternatively or additionally, the plurality of first interface elements may be provided such that, in the cross-sectional profile of the motor-unit-side end, the plurality of first interface elements are arranged rotationally-symmetric around the longitudinal axis. Specifically, the cross-sectional profile may be perpendicular to the longitudinal axis. By such a configuration, it may be ensured that the motor unit can be secured to the coupling flange in at least two or four or more modern positions. Alternatively or additionally, the plurality of first interface elements may be provided such that, in the cross-sectional profile of the motor-unit-side end, the plurality of first interface elements are arranged mirror symmetric in relation to a first mirror line being perpendicular to the longitudinal axis and a second mirror line being perpendicular to both the longitudinal axis and the first mirror line. The first mirror line and the second mirror line may intersect at the longitudinal axis.

Further, the coupling flange may comprise a gearbox-side end, via which the gearbox may be coupled to the coupling flange. The gearbox-side end may be arranged opposed to the motor-unit-side end, particularly along the longitudinal axis. Specifically, the gearbox-side end may constitute a gearbox-side interface. In the state in which the gearbox is coupled to the coupling flange, the gearbox-side end or interface may be engaged with or abut on the gearbox, i.e. a complementary designed interface thereof. Further, the gearbox-side end may comprise a plurality of second interface elements for structurally coupling the gearbox to the coupling flange. The second interface elements may be at least one of a connecting element, such as a connecting bolt or screw, and a through bore or through hole for receiving and engaging with a connecting element. Further, the interface element may comprise a contour of the gearbox-side end which may be configured to be engaged with a complementary designed recces provided at the motor unit, thereby form-fittingly connecting the coupling flange to the gearbox, particularly so as to align the gearbox relative to the coupling flange.

As set forth above, the coupling flange may be configured to limit the coupling of the gearbox to the coupling flange to one single mounting position. Thus, the plurality of second interface elements may be provided to enable that the gearbox can be coupled to the coupling flange into only one single mounting position. For doing so, the plurality of second interface elements may be provided such that, in a cross-sectional profile of the motor-unit-side end, the plurality of second interface elements are arranged such that they are non-mirror symmetric in relation to at least one of a first line being perpendicular to the longitudinal axis and a second line being perpendicular to both the longitudinal axis and the first mirror line.

In case, the coupling flange is configured to limit the coupling of the gearbox to the coupling flange to at least two different mounting positions, the second interface elements may be designed similarly or correspondingly to the first interface elements as described above. Accordingly, when the coupling flange is configured to limit the coupling of the motor unit to the coupling flange to a single mounting position, the first interface elements may be designed similarly or correspondingly to the second interface elements as described above.

Furthermore, a drive unit, particularly for use in a mining machine, e.g. an underground mining machine, such as a longwall mining machine, may be provided which is equipped with a gearbox and a motor unit. In the drive unit, the gearbox and the motor unit may be structurally interconnected by means of a coupling flange as described above. Since the proposed drive unit is equipped with the above described coupling flange, technical features which are described in connection with the coupling flange in the present disclosure may also relate and be applied to the proposed drive unit, and vice versa.

For solving the objective of providing an improved coupling between components within the drive unit, the following items may be provided:

1. Coupling flange (170) of a drive unit (12) for use in a mining machine, which is configured for structurally coupling a motor unit (14) to a gearbox (16) in at least two different spatial arrangements relative to one another, among which the motor unit (14) and the gearbox (16) are arranged rotationally offset relative to one another.
2. Coupling flange according to item 1, which is configured such that, in a first assembled state in which the motor unit (14) and the gearbox (16) are coupled to the coupling flange (170) in a first spatial arrangement, the motor unit (14) and the gearbox (16) are arranged rotationally offset relative to one another in relation to a second assembled state in which the motor unit (14) and the gearbox (16) are coupled to the coupling flange (170) in a second spatial arrangement.
3. Coupling flange according to item 1 or 2, which is provided with a through opening (172) and designed such that, in an assembled state, in which the motor unit (14) and the gearbox (16) are coupled to the coupling flange (170), a drive shaft interconnecting the motor unit (14) and the gearbox (16) in a torque-transmitting manner is accommodated in the through opening (172).
4. Coupling flange according item 3, which is configured such that, when being arranged in any one of the different spatial arrangements, a longitudinal axis (L) of the coupling flange (170) coincides with a rotational axis of the drive shaft.
5. Coupling flange according to any one of items 2 to 4, which is configured such that, in the first assembled state, the motor unit (14) is rotated relative to the gearbox (16) around the longitudinal axis (L) of the coupling flange (170) in relation to the second assembled state.
6. Coupling flange according to any one of items 2 to 5, which is configured such that, in the first assembled state, the motor unit (14) is rotated relative to the gearbox (16) about 90° or 180° around the longitudinal axis (L) of the coupling flange (170) in relation to the second assembled state.
7. Coupling flange according to any one of items 1 to 6, which is configured for holding the motor unit (14) in at least two different mounting positions, among which the motor unit (14) is arranged rotationally offset relative to the coupling flange (170).
8. Coupling flange according to any one of items 1 to 7, wherein in a first mounted state in which the motor unit (14) is coupled to the coupling flange (170) in a first mounting position, the motor unit is arranged rotationally offset relative to the coupling flange (170) in relation to a second mounted state in which the motor unit (14) is coupled to the coupling flange (170) in a second mounting position.
9. Coupling flange according to item 8, which is configured such that, in the first mounted state, the motor unit (14) is rotated relative to the coupling flange (170), in particular about 90° or 180°, around the longitudinal axis (L) of the coupling flange (170) in relation to the second mounted state.
10. Coupling flange according to any one of items 1 to 9, which is configured to limit the coupling of the motor unit (14) to the coupling flange (170) to at least two mounting positions, in each of which a relative orientation between the motor unit (14) and the coupling flange (170) is predefined.
11. Coupling flange according to any one of items 1 to 10, which is configured to limit the coupling of the gearbox (16) to the coupling flange (170) to a single mounting position, in which a relative orientation between the gearbox (16) and the coupling flange (170) is predefined.
12. Coupling flange according to any one of items 1 to 11, which comprises a motor-unit-side end (174) having a plurality of first interface elements (178, 180) for structurally coupling the motor unit (14) to the coupling flange (170), wherein in a cross-sectional profile of the motor-unit-side end (174), the plurality of first interface elements (178, 180) form a regular pattern of interface elements comprising at least two congruent parts (182a-d) which are rotationally offset relative to one another around the longitudinal axis (L) of the coupling flange (170).
13. Coupling flange according to any one of items 1 to 12, wherein in the cross-sectional profile of the motor-unit-side end (174), the plurality of first interface elements (178, 180) are arranged rotationally-symmetric around the longitudinal axis (L) of the coupling flange (170).
14. Coupling flange according to any one of items 1 to 13, which comprises a gearbox-side end (176) having a plurality of second interface elements (188, 190) for structurally coupling the gearbox (16) to the coupling flange (170), wherein in a cross-sectional profile of the gearbox-side end (176), the plurality of second interface elements (188, 190) are arranged non-mirror symmetric in relation to at least one of a first line (192) being perpendicular to the longitudinal axis (L) of the coupling flange (170) and a second line (194) being perpendicular to both the longitudinal axis (L) of the coupling flange (170) and the first line (192).
15. Drive unit (12) of a mining machine, comprising a motor unit (14) and a gearbox (16) which are structurally interconnected by means of a coupling flange (170) according to any one of items 1 to 14.

INDUSTRIAL APPLICABILITY

With reference to the Figures, an electric terminal assembly 26 and a drive unit assembly 10 being equipped with such an electric terminal assembly 26 for use in a mining machine is suggested. The suggested electric terminal assembly 26 as mentioned above is applicable in any drive unit arrangement. Further, the suggested electric terminal assembly 26 may replace conventional wiring systems and may serve as a replacement or retrofit part.

Further, with reference to the Figures, in particular FIGS. 17 to 19, a gearbox 16 and a drive unit 12 of a mining machine equipped with such a gearbox 16 are suggested. The suggested gearbox 16 as mentioned above is applicable in drive units of a mining machine and may replace conventional gearboxes or may serve as a replacement or retrofit part.

Still further, with reference to the Figure, in particular FIGS. 20 to 23, a coupling flange 170 for coupling a motor unit 14 to a gearbox 16 in a drive unit of a mining machine is suggested. The suggested coupling flange 170 as mentioned above is applicable in drive unit of a mining machine and may replace conventional couplings or may serve as a replacement or retrofit part.

The invention claimed is:
1. A electric terminal assembly of a drive unit for use in a mining machine, comprising a junction box configured to be mounted to the drive unit and a connecting element for communicatively connecting the junction box to a control device of the drive unit, wherein the electric terminal assembly is configured to be convertibly arranged into at least two different configurations, each of which is associated to a different structural arrangement of the drive unit.
2. The electric terminal assembly according to claim 1, wherein the junction box comprises or is connected to at least one sensor configured to acquire data being indicative of an operating condition of the drive unit, and wherein the junction box is configured to transmit the data acquired by the sensor to the control device via the connecting element.
3. The electric terminal assembly according to claim 2, wherein the junction box comprises a data-collecting device configured to collect or process the data acquired by the sensor before being forwarded to the control device via the connecting element.

4. The electric terminal assembly according to claim 1, wherein the junction box comprises a first control port and a second control port, each of which is configured to be detachably coupled to the connecting element.

5. The electric terminal assembly according to claim 4, wherein the first and the second control port are provided on opposed sides of the junction box.

6. The electric terminal assembly according to claim 4, which is configured to be arranged into a first configuration, in which the connecting element is coupled to the first control port, and into a second configuration, in which the connecting element is coupled to the second control port.

7. The electric terminal assembly according to claim 1, further comprising a connection socket provided on a control device side of the electric terminal assembly, to which the junction box is communicatively connected via the connecting element, wherein the connection socket comprises a first connector and a second connector, each of which is configured to be detachably coupled to the connecting element.

8. The electric terminal assembly according to claim 7, which is configured to be arranged into a first configuration, in which the connecting element is coupled to the first connector, and into a second configuration, in which the connecting element is coupled to the second connector of the connection socket.

9. The electric terminal assembly according to claim 1, wherein the junction box comprises a first sensor port and a second sensor port, each of which is configured to be detachably coupled to a sensor line for receiving at least one of a sensor input or a sensor output.

10. The electric terminal assembly according to claim 9, wherein the first and the second sensor port are provided on opposed sides of the junction box.

11. The electric terminal assembly according to claim 9, which is configured to be arranged into a first configuration, in which the sensor line is coupled to the first sensor port, and into a second configuration, in which the sensor line is coupled to the second sensor port.

12. The electric terminal assembly according to claim 1, further comprising a protective cover having at least two shielding plates which are configured to be variedly connected to one another, wherein the protective cover is configured to be convertibly arranged into at least two different configurations, each of which is associated to a different structural arrangement of a drive unit.

13. The electric terminal assembly according to claim 12, wherein at least one shielding plate comprises a first structural interface and a second structural interface, each of which is configured to be detachably fastened to another shielding plate, and wherein the electric terminal assembly is configured to be arranged into a first configuration, in which the first structural interface is fastened to the other shielding plate, and into a second configuration, in which the second structural interface is fastened to the other shielding plate.

14. A drive unit arrangement for use in a mining machine, comprising a drive unit and an electric terminal assembly according to claim 1.

15. The drive unit arrangement according to claim 14, wherein the drive unit is configured to be arranged into at least two different structural arrangements, among which a relative arrangement between a motor unit and a gearbox differs.

* * * * *